US011745594B2

(12) United States Patent
Wang et al.

(10) Patent No.: US 11,745,594 B2
(45) Date of Patent: Sep. 5, 2023

(54) DYNAMIC INDUCTIVE WIRELESS POWER TRANSMITTER SYSTEM WITH A POWER TRANSMITTER MODULE

(71) Applicants: Hongjie Wang, North Logan, UT (US); Regan A. Zane, Hyde Park, UT (US)

(72) Inventors: Hongjie Wang, North Logan, UT (US); Regan A. Zane, Hyde Park, UT (US)

(73) Assignee: Utah State University, Logan, UT (US)

( * ) Notice: Subject to any disclaimer, the term of this patent is extended or adjusted under 35 U.S.C. 154(b) by 99 days.

(21) Appl. No.: 17/239,336

(22) Filed: Apr. 23, 2021

(65) Prior Publication Data

US 2021/0237602 A1 Aug. 5, 2021

Related U.S. Application Data

(62) Division of application No. 15/711,667, filed on Sep. 21, 2017, now Pat. No. 11,059,380.

(51) Int. Cl.
*B60L 5/00* (2006.01)
*H02J 50/40* (2016.01)
(Continued)

(52) U.S. Cl.
CPC .............. *B60L 5/005* (2013.01); *B60L 9/00* (2013.01); *B60L 50/53* (2019.02); *B60L 53/12* (2019.02);
(Continued)

(58) Field of Classification Search
CPC .......... B60L 5/005; B60L 53/12; B60L 53/36; B60L 53/39; B60L 50/53; B60L 9/00;
(Continued)

(56) References Cited

U.S. PATENT DOCUMENTS

| 5,311,973 A | 5/1994 | Tseng et al. |
| 2015/0214738 A1* | 7/2015 | Covic ................. H02J 3/14 307/31 |

(Continued)

OTHER PUBLICATIONS

Wang et al., "Analysis and design of a series resonant converter with constant current input and regulated output current" IEEE Xplore Digital Library pp. 1741-1747 (Mar. 26, 2017).
(Continued)

*Primary Examiner* — Rexford N Barnie
*Assistant Examiner* — Swarna N Chowdhuri
(74) *Attorney, Agent, or Firm* — Kunzler Bean & Adamson; Bruce R. Needham

(57) ABSTRACT

A method for a dynamic inductive wireless power transmission includes providing an AC/DC power converter that receives three-phase power and provides regulated DC output current, connecting a trunk cable to the AC/DC power converter output and to multiple power transmitter modules. The trunk cable connects inputs of the power transmitter modules in series. The power transmitter modules transmit inductive wireless power over an air gap. The method includes providing a system controller that detects a vehicle containing a receiver coil and confirms if the vehicle should receive the inductive wireless power from the multiple power transmitter modules, and includes configuring the system controller to communicate with the AC/DC power converter to maintain the regulated DC output current at a constant value and transmit the inductive wireless power to the vehicle through the multiple power transmitter modules when the vehicle should receive the inductive wireless power.

17 Claims, 19 Drawing Sheets

(51) Int. Cl.
- *H02J 50/12* (2016.01)
- *H02J 50/80* (2016.01)
- *B60L 53/12* (2019.01)
- *B60L 53/39* (2019.01)
- *B60L 53/36* (2019.01)
- *B60L 50/53* (2019.01)
- *B60L 9/00* (2019.01)
- *H02J 50/90* (2016.01)

(52) U.S. Cl.
CPC .............. *B60L 53/36* (2019.02); *B60L 53/39* (2019.02); *H02J 50/12* (2016.02); *H02J 50/40* (2016.02); *H02J 50/80* (2016.02); *B60L 2210/40* (2013.01); *H02J 50/90* (2016.02)

(58) Field of Classification Search
CPC ....... B60L 2210/40; H02J 50/80; H02J 50/12; H02J 50/40; H02J 50/90
USPC .......................................................... 307/9.1
See application file for complete search history.

(56) References Cited

U.S. PATENT DOCUMENTS

| | | | |
|---|---|---|---|
| 2017/0170688 A1* | 6/2017 | Maniktala | H01F 38/14 |
| 2017/0310164 A1* | 10/2017 | Abdolkhani | H02J 50/12 |
| 2018/0178666 A1* | 6/2018 | Javaid | B60L 5/005 |
| 2018/0351415 A1* | 12/2018 | Masquelier | B60L 53/67 |
| 2019/0084433 A1 | 3/2019 | Wang et al. | |

OTHER PUBLICATIONS

Wang et al., "Design considerations for series resonant converters with constant current input" IEEE Xplore Digital Library pp. 1-8 (Sep. 18, 2016).

USPTO Final Office Action, U.S. Appl. No. 15/711,667, dated Dec. 10, 2020.

USPTO Non-Final Office Action, U.S. Appl. No. 15/711,667, dated May 28, 2020.

* cited by examiner

DYNAMIC INDUCTIVE WIRELESS POWER TRANSMITTER SYSTEM WITH A POWER TRANSMITTER MODULE

CROSS-REFERENCES TO RELATED APPLICATIONS

This patent application is related to U.S. Non-Provisional application Ser. No. 15/711,667, filed Sep. 21, 2017 and entitled DYNAMIC INDUCTIVE WIRELESS POWER TRANSMITTER SYSTEM WITH A POWER TRANSMITTER MODULE, which is incorporated herein by reference in its entirety.

FIELD

The present disclosure relates to wireless-power transfer to a stationary or moving vehicle.

BACKGROUND

Electrical energy may be transmitted wirelessly to a vehicle.

SUMMARY

The present disclosure in aspects and embodiments addresses these various needs and problems by providing a dynamic inductive wireless power transmitter system and power transmitter module.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
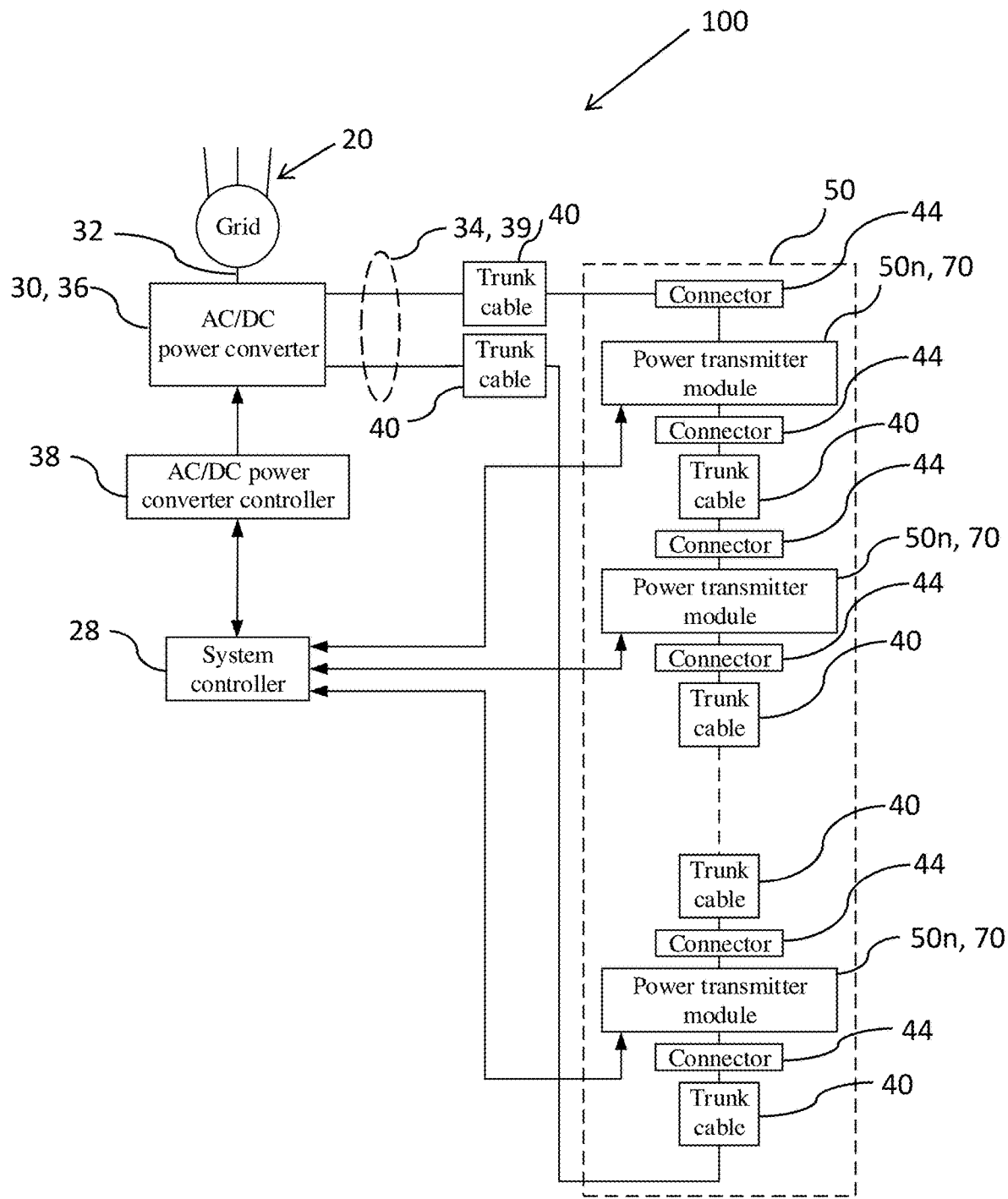
FIG. 1 illustrates a topology diagram of an embodiment of a dynamic inductive wireless power transmitter ("DIPT") system.

The present disclosure covers apparatuses and associated methods for a dynamic inductive wireless power transmitter system and power module. In the following description, numerous specific details are provided for a thorough understanding of specific preferred embodiments. However, embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

Furthermore, the described features, advantages, and characteristics of the embodiments may be combined in any suitable manner. Embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. Aspects of the present invention may be embodied as a system, method, and/or computer program product. Accordingly, aspects of the present invention may take the form of an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

The present disclosure covers systems and methods for a dynamic inductive wireless power transmitter system and power transmitter modules.

DYNAMIC INDUCTIVE WIRELESS POWER TRANSMITTER ("DIPT") SYSTEMS

Figure 2:
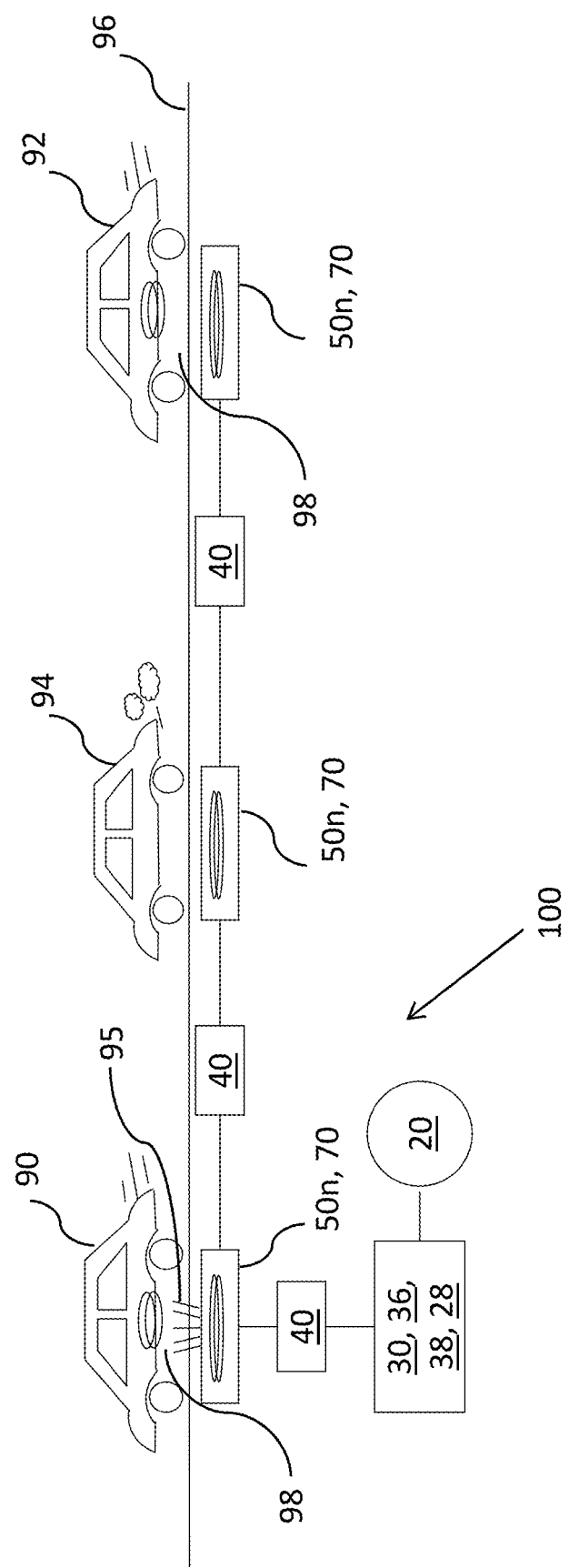
FIG. 2 illustrates an example physical diagram of a DIPT system.

FIGS. 1 and 2 illustrate a DIPT system 100. In embodiments, a DIPT system 100 includes an AC-to-DC (AC/DC) power converter 30. The AC/DC power converter 30 is configured to receive three-phase power 20 from an AC utility source (not shown) and provide regulated DC output current 39 through an AC/DC power converter output 34.

In embodiments, the AC/DC power converter includes an AC/DC power converter transistor switch 36 configured to control the flow of the regulated DC output current 39.

The DIPT system 100 further includes a trunk cable 40 electrically connected to the AC/DC power converter 30 and multiple 50 power transmitter modules 50n electrically connected to the trunk cable 40 and connected to each other in series. In embodiments, the power transmitter modules 50n are connected with connectors 44. Each of the multiple power transmitter modules 50n are configured to transmit inductive wireless power 95 (shown in FIG. 2) over an air gap 98 from the DIPT system 100 to a vehicle containing a receiver coil 90.

The DIPT system 100 further includes a system controller 28 configured to detect a vehicle containing a receiver coil 90, identify the vehicle containing a receiver coil 90, and confirm if the vehicle containing a receiver coil 90 should receive inductive wireless power 95 from the DIPT system 100.

In embodiments, and as illustrated in FIG. 1, the system controller 28 communicates with the multiple 50 power transmitter modules 50n as described hereinafter.

The system controller 28 is further configured to communicate with the AC/DC power converter 30 and enable the flow of regulated DC output current 39 from the AC/DC power converter 30 such that inductive wireless power 95 is transmitted to the vehicle containing a receiver coil 90 through one of the multiple power transmitter modules 50n when the vehicle containing a receiver coil 90 is in a position to receive the inductive wireless power 95 from the DIPT system 100.

As an example, FIG. 2 also illustrates a vehicle without a receiver coil 94 and another vehicle with a receiver coil 92 that should not receive power from the DIPT system 100.

Each of the vehicles in FIG. 2 are in motion and may be travelling up to highway speeds, which, in the United States, can be as high as 85 miles-per-hour or faster. The vehicles 90, 92, and 94 may or may not be travelling at prescribed safe following distances from one another. FIG. 2 illustrates vehicles 90, 92, and 94 above one of the module transmitter modules 50n capable of transmitting inductive wireless power 95 over an air gap 98. In the FIG. 2 illustration, and in embodiments, the vehicle containing a receiver coil 90 is in a position to receive the inductive wireless power 95 from the DIPT system 100 because it is over and aligned with one of the multiple power transmitter modules 50.

In FIG. 2, the other vehicle with a receiver coil 92 that should not receive power from the DIPT system 100 is also illustrated as being over and aligned with one of the multiple power transmitter modules 50n, but it is not receiving inductive wireless power 95 from the DIPT system 100. The other vehicle with a receiver coil 92 that should not receive power (and is not receiving power) from the DIPT system 100 may not be receiving power for multiple reasons. For example, the vehicle 92 may not subscribe to receive power from the utility providing power through the DIPT system 100. Alternatively, the vehicle 92 may not need to receive power at the time it is over and aligned with one of the multiple power transmitter modules 50 because its batteries, or other energy storage means, may be nearly full or otherwise incapable of receiving additional power at that time.

FIG. 2 illustrates vehicles 90, 92, and 94 as passenger vehicles. Vehicles 90, 92, and 94 may be any type of vehicle that travels on a roadway 96, for example: trucks, tractor trailers, busses, vans, personal transportation devices, etc. Roadway 96 may be any type of road or off-road path, for example, a train track, monorail, a factory floor, a conveyor belt, or any other path a vehicle may travel. As roadway 96 may be any type of path, vehicles 90, 92, and 94 may be any type of vehicle that travels off-road or on other types of paths, for example: locomotives or trains, service vehicles such as forklifts or cargo carriers, or any device configured to receive inductive wireless electric power while in motion or stationary.

Figure 3:
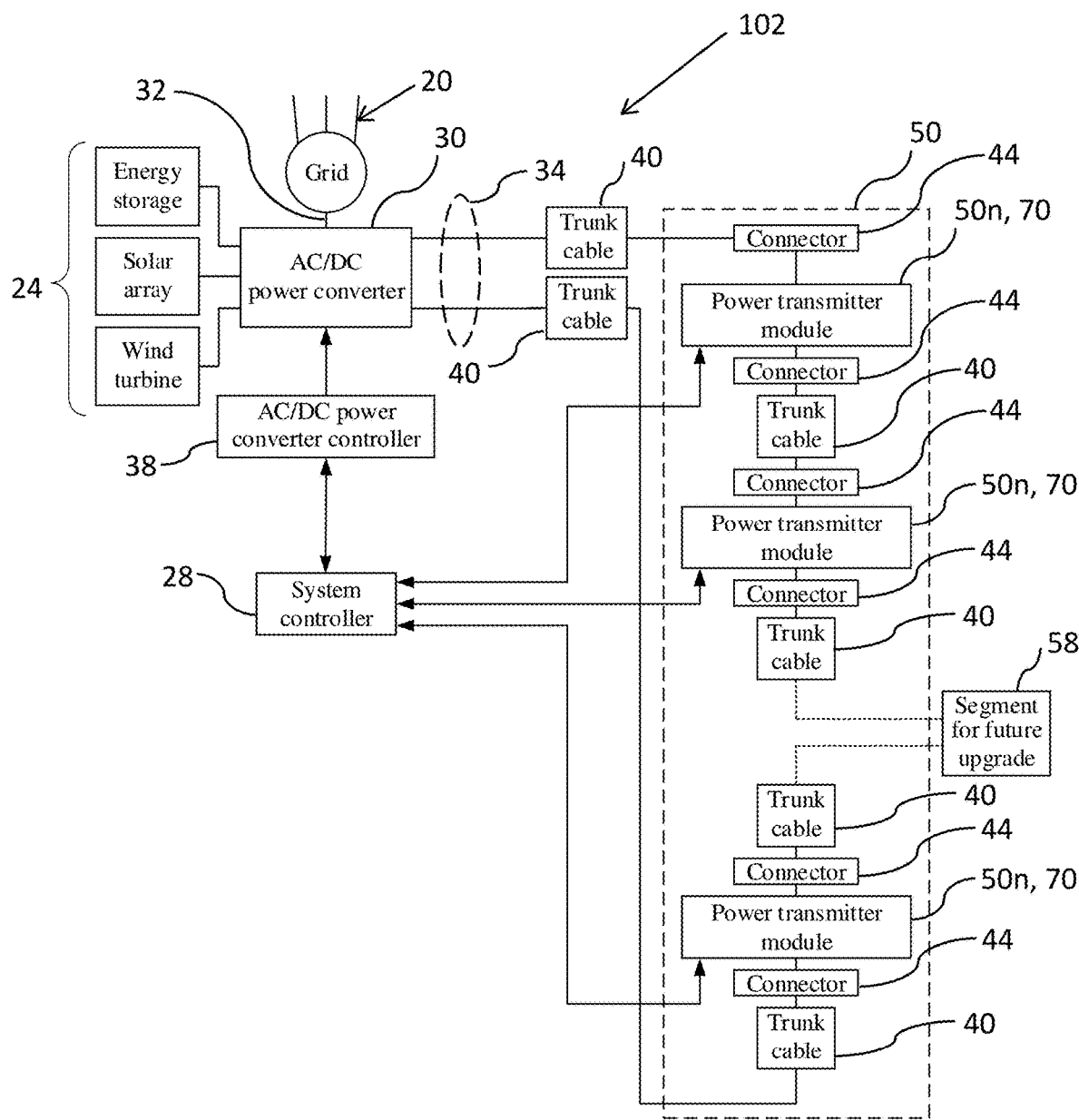
FIG. 3 illustrates another topology diagram of DIPT system.

FIG. 3 illustrates another embodiment of a DIPT system 102. DIPT system 102 further includes an additional power source 24 electrically connected to the AC/DC power converter 30. The power source 24 may be a battery bank, a capacitor bank, a photovoltaic solar array, or a wind turbine.

FIG. 3 also illustrates DIPT system 102 with an upgrade segment 58. The upgrade segment 58 may connect to additional AC/DC power converters, like AC/DC power converter 30, or additional multiple power transmitter modules 50.

In other embodiments, the system controller 28 may be further configured to wirelessly communicate with the vehicle containing a receiver coil 90 and use the communication to determine whether the vehicle containing the receiver coil 90 (shown in FIG. 2) should receive the inductive wireless power 95 from the DIPT system 100 or 102 and then activate one or more of the multiple 50 power transmitter modules 50n such that the one or more of the multiple 50 power transmitter modules 50n transfers the inductive wireless power 95 to the vehicle containing a receiver coil 90.

Still in other embodiments, the system controller 28 may be configured to wirelessly communicate with the vehicle containing a receiving coil 92 (shown in FIG. 2) that should not receive power from the DIPT system 100 or 102. The system controller 28 may use the communication to determine that the vehicle containing the receiver coil 92 should not receive the inductive wireless power 95 from the DIPT system 100 or 102. The system controller 28 may further maintain inactive the one or more of the multiple 50 power transmitter modules 50n such that the one or more of the multiple 50 power transmitter modules 50n does not transfer the inductive wireless power 95 to the vehicle containing a receiving coil 92 that should not receive power from the DIPT system 100 or 102.

In another embodiment, the wireless communication with the vehicle containing a receiving coil (e.g., 90, 92) may be a secure code, wherein the secure code is derived from information sent at an earlier time from the system controller 28 to the vehicle containing a receiving coil 92.

The system controller 28 may be further be configured to detect the arrival and alignment of the vehicle containing a receiving coil (e.g., vehicles 90, 92) and activate one or more of the multiple 50 power transmitter modules 50n based on a signal received from the vehicle containing a receiving coil (e.g., vehicles 90, 92). The system controller 28 may also detect the departure of the vehicle containing a receiving coil (e.g., vehicles 90, 92) and deactivate the one or more of the multiple 50 power transmitter modules 50n based on a measure of inductive wireless power 95 being delivered by the one or more of the multiple 50 power transmitter modules 50n.

Figure 4:
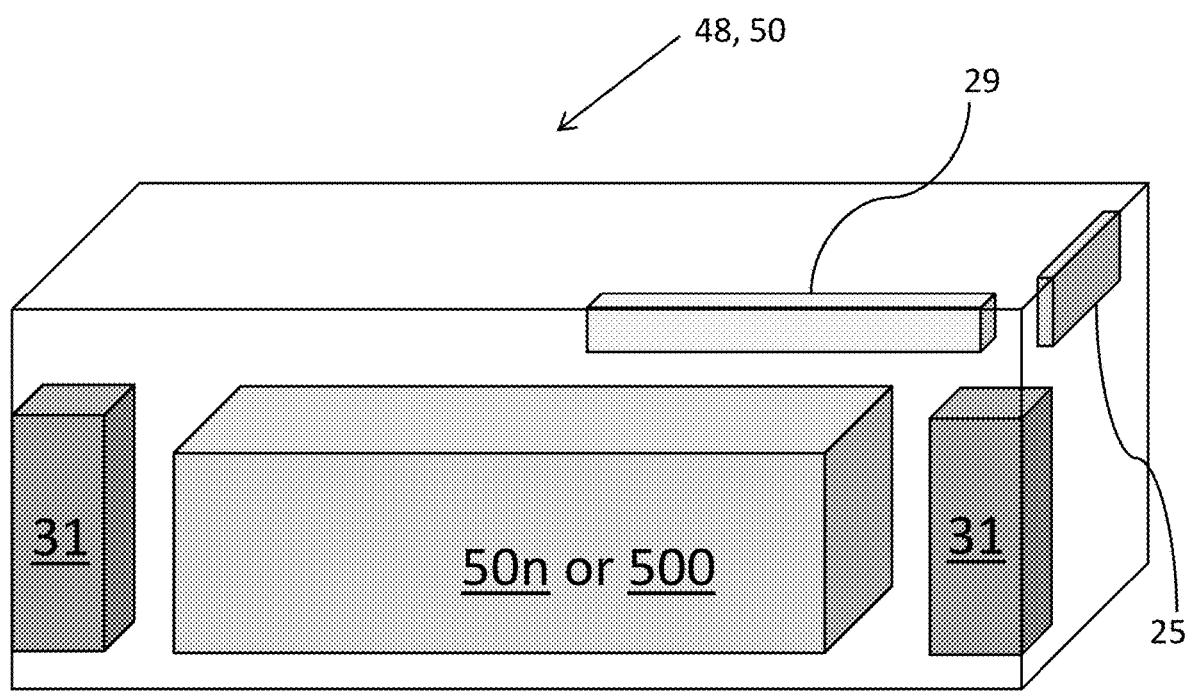
FIG. 4 illustrates an example of a concrete module housing a power transmitter module.

FIG. 4 illustrates one of the multiple 50 power transmitter modules 50n embedded in a precast concrete module 48. A precast concrete module may contain one of the multiple 50 power transmitter modules 50n, a cable segment and connector 31, a vehicle detection circuit 29, or other roadway module components, as will be described hereafter. A vehicle detection circuit 29 may be capable of detecting the speed, alignment, position, or other position or motion attribute of a vehicle (e.g., vehicle 90, 92, or 94) traveling along the roadway.

In other embodiments of the DIPT system 100 or 102, each of the multiple 50 power transmitter modules 50n are embedded in a precast concrete module 48 and configured to connect in series to each other. Alternatively, at least one of the multiple 50 power transmitter modules 50n and a portion of the trunk cable 40 are embedded in a precast concrete module 48 and configured to connect to another of the multiple 50 power transmitter modules 50n in series.

FIGS. 1, 3, and 4 further illustrate the trunk cable 40 wiring configuration. In embodiments, the trunk cable 40 has an outgoing current path from one of the multiple power transmitter modules 50n and a return current path back to the AC/DC power converter 30. In addition, the one of the multiple power transfer modules 50n is embedded in a precast concrete module 48 and only the outgoing current path is connected and transmitted through the precast concrete module 48 and the return path (shown as a line between trunk cables 40) is routed outside of the precast concrete module 48. In embodiments, routing the return path outside of the precast concrete module enhances the modularity of the DIPT system 100 or 102. In embodiments, the return path may be a single cable from the end of a series of multiple 50 power transmitter modules 50n back to the AC/DC power converter 30, unlike the outgoing current path which may have many short segments connecting the multiple 50 power transfer modules 50n in series. So, by routing the return path outside of the precast concrete module 48, the cost and the construction complexity can be reduced, and the modularity of the system can be increased.

Figure 5:
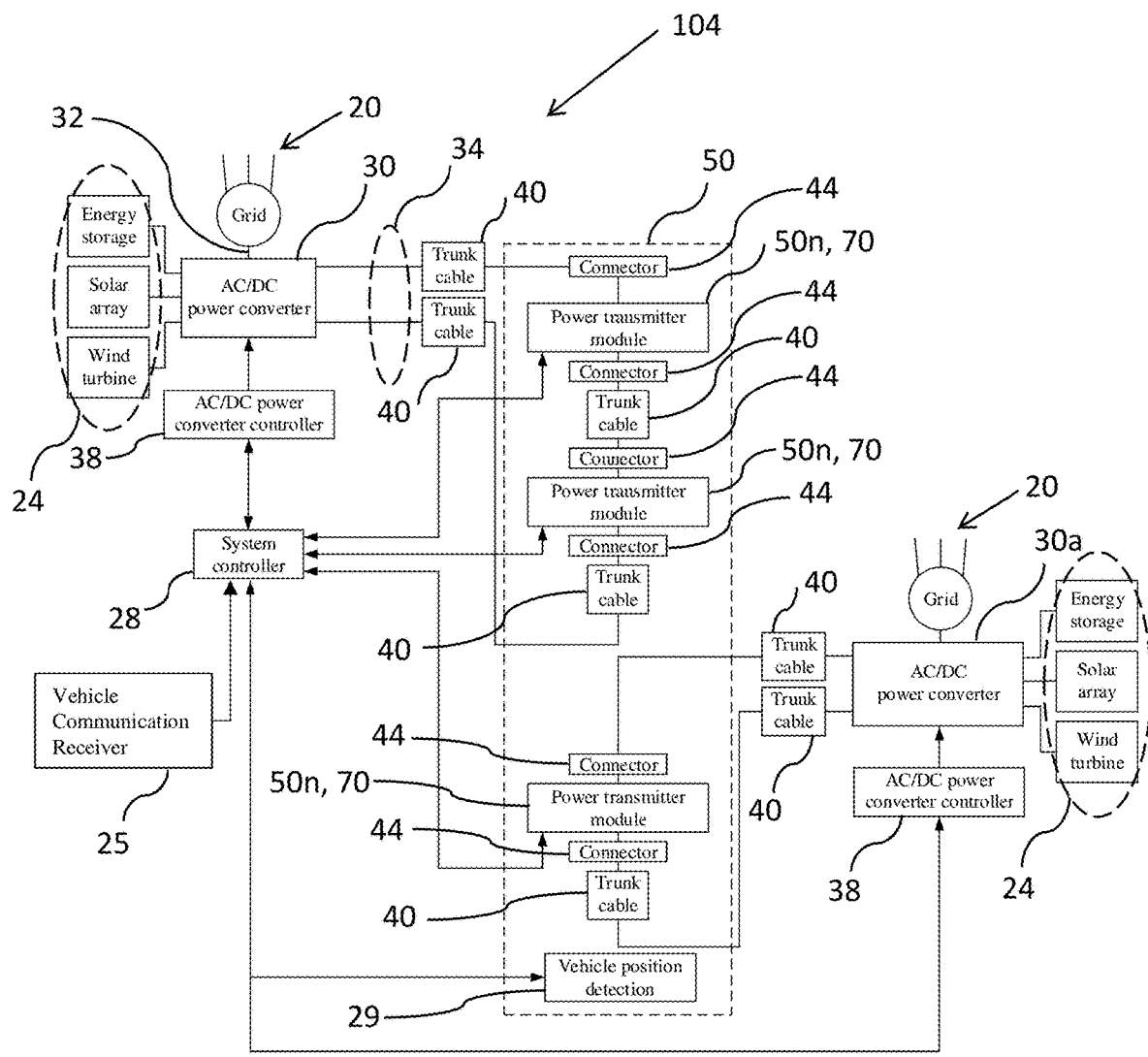
FIG. 5 illustrates another topology diagram of DIPT system.

FIG. 5 further illustrates another DIPT system 104. In embodiments, the trunk cable 40 is configured to electrically connect to a second (or additional) AC/DC power converter 30a, the second AC/DC power converter 30a is configured to increase the power capability of the DIPT system 104. In other embodiments, the trunk cable 40 may be configured to electrically connect to additional, multiple AC/DC power converters (not shown).

FIG. 5 also illustrates the addition of a vehicle detection circuit 29 to DIPT system 104. In embodiments, a DIPT system 104 further includes a vehicle detection circuit 29 configured to indicate when the vehicle or vehicles containing a receiver coil 90, 92 is arriving and aligned with one of the multiple 50 power transmitter modules 50n.

FIG. 5 further illustrates a vehicle communication receiver 25, which is configured to indicate when a vehicle (or vehicles) containing a receiver coil (e.g., 90, 92) is arriving and aligned with one of the multiple power transmitter modules 50n. In embodiments, the vehicle communication receiver 25 provides vehicle information to the system controller 28.

Referring back to FIGS. 1, 2, 3, and 5, in embodiments, the multiple vehicles containing a receiver coil (e.g., vehicles 90, 92) may all be capable of receiving inductive wireless power 95. In embodiments, multiple 50 of the multiple power transmitter modules 50n are physically located next to each other and configured to activate simultaneously and deliver the inductive wireless power 95 simultaneously to multiple vehicles containing a receiver coil (e.g., vehicles 90, 92).

As another example, some vehicles containing a receiver coil (e.g., vehicles 90, 92), such as a bus, tractor trailer, or train, may be long enough to accommodate and contain multiple receiver coils. A DIPT system (such as DIPT system 100, 102, or 104) may be configured to activate multiple 50 of the multiple power transmitter modules 50n simultaneously and deliver the inductive wireless power 95 simultaneously to the multiple receiving coils on a vehicle.

A system controller 28 may be further configured to catalog the vehicle containing a receiver coil 90, 92, determine a status of the vehicle containing a receiver coil 90, 92, record the time of passage of the vehicle containing a receiver coil 90, 92, and/or measure the amount of the inductive wireless power 95 transferred (or not transferred) to the vehicle containing a receiver coil 90, 92. Additionally, a system controller 38 may be further configured to communicate with the vehicle containing a receiver coil 90, 92 and assess the amount of inductive wireless power 95 the vehicle containing a receiver coil 90, 92 is receiving from the DIPT system 100, 102, or 104.

METHODS FOR PROVIDING DYNAMIC INDUCTIVE WIRELESS POWER TRANSFER ("DIPT")

Figure 6:
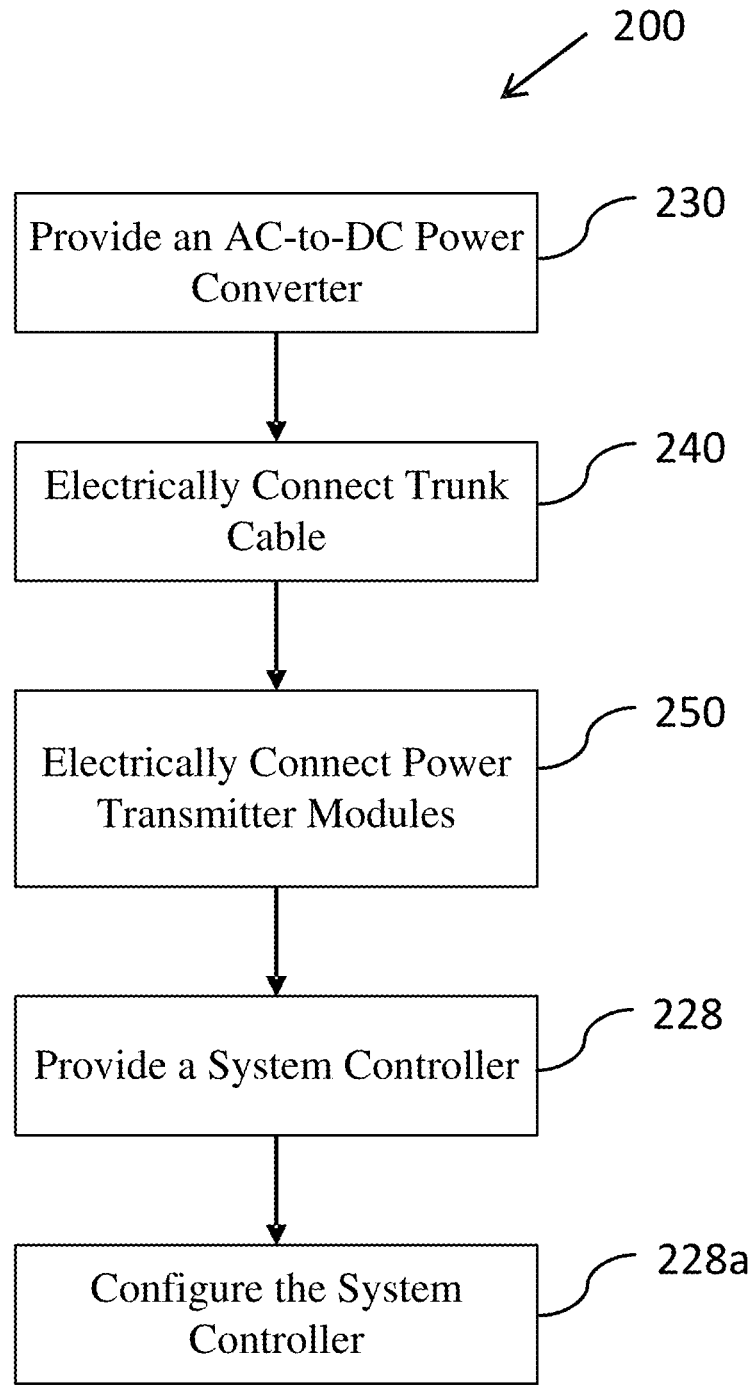
FIGS. 6, 7, and 8 illustrate various methods for providing DIPT systems.

The present disclosure describes methods for providing DIPT. FIG. 6 illustrates a method 200 for providing DIPT. In embodiments, the method 200 includes providing 230 an AC/DC power converter 30. The AC/DC power converter 30 (shown in FIGS. 1, 2, 3, and 5) includes a three-phase AC/DC power converter input 32 configured to receive three-phase power 20 from an AC utility source. The AC/DC power converter 30 further includes an AC/DC power converter output 34 configured to provide regulated DC output current, an AC/DC power converter controller 38 configured to control a state of an AC/DC power converter transistor switch 36 such that the state of the AC/DC power converter transistor switch 36 regulates the regulated DC output current 39 (shown in later figures).

The method 200 further includes electrically connecting 240 a trunk cable 40 to the AC/DC power converter output 34, electrically connecting 250 multiple power transmitter modules 50 to the trunk cable 40 and to each other in series. The multiple power transmitter modules 50 are configured to transmit inductive wireless power 95 (shown in FIG. 2) over an air gap 98 (also shown in FIG. 2).

The method 200 further includes providing 228 a system controller 28 configured to detect a vehicle containing a receiver coil 90 or 92, identify the vehicle containing a receiver coil 90 or 92, and confirm if the vehicle containing a receiver coil 90 or 92 should receive the inductive wireless power from the multiple power transmitter modules 50.

The method 200 further includes configuring 228a the system controller 28 to communicate with the AC/DC power converter 30 to enable the regulated DC output current from the AC/DC power converter 30 and transmit the inductive wireless power 95 to the vehicle containing a receiver coil 90 or 92 through the multiple power transmitter modules 50 when the vehicle containing a receiver coil 90 or 92 should receive the inductive wireless power 95 from the multiple power transmitter modules 50.

Figure 7:
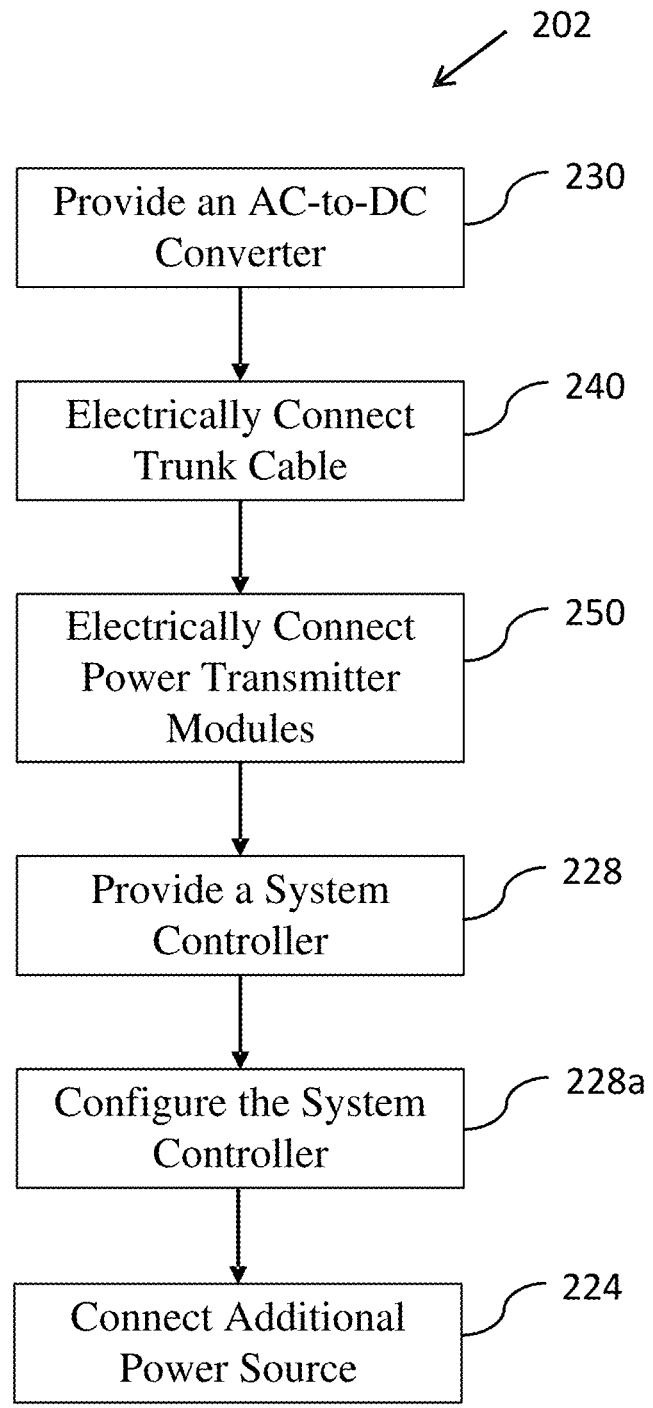
Figure 8:
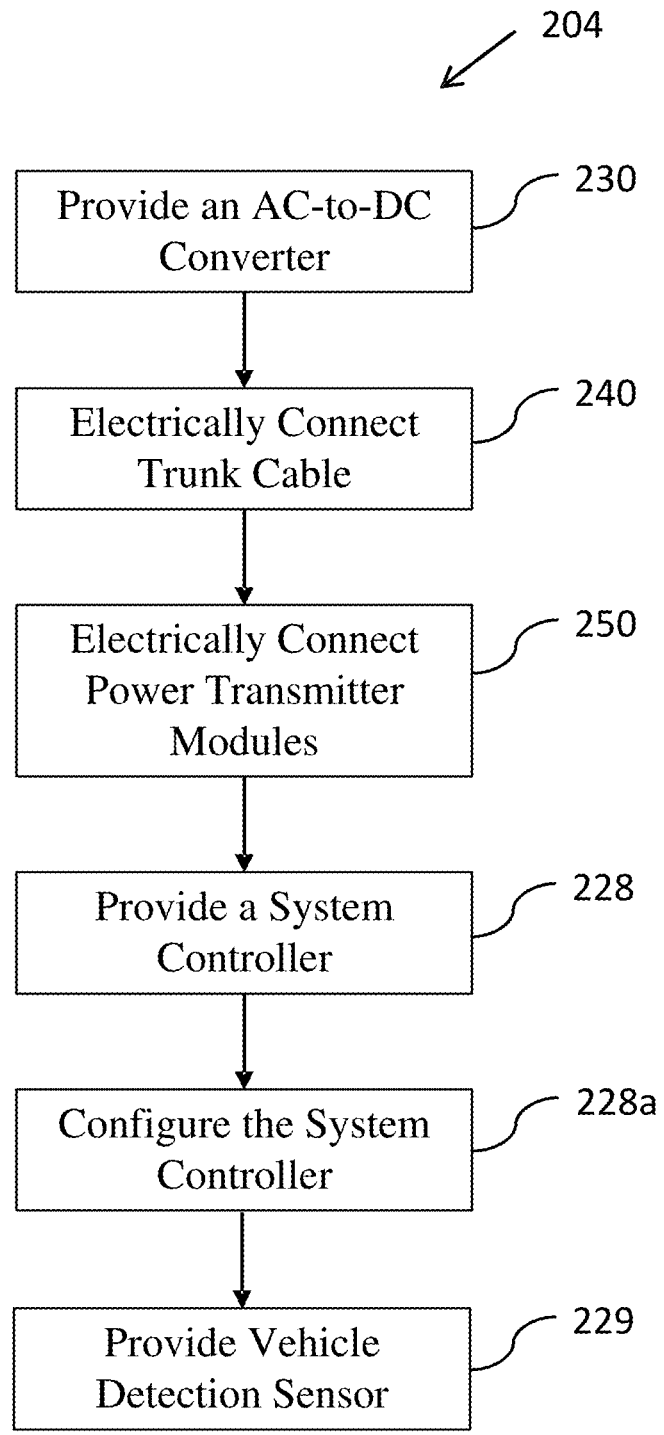

FIG. 7 illustrates other steps that may be added to a method for providing DIPT. In another embodiment, a method 202 includes electrically connecting 224 an additional power source 24 to the AC/DC power converter 30. The power source 24 may be a battery bank, a capacitor bank, a photovoltaic solar array, or a wind turbine.

In embodiments, the step of configuring 228a the system controller 28 may further comprise configuring the system controller 28 to wirelessly communicate with the vehicle containing a receiver coil 90. The system controller 28 may use the communication to determine whether the vehicle containing the receiver coil 90 should receive the inductive wireless power 95, and activate one or more of the multiple 50 power transmitter modules 50n such that the one or more of the multiple power transmitter modules 50n transfers the inductive wireless power 95 to the vehicle containing a receiver coil 90.

In an alternate embodiment, or in addition, the step of configuring 228a the system controller 28 may further comprise configuring the system controller 28 to wirelessly communicate a secure code 99 with the vehicle containing a receiver coil 90, wherein the secure code 99 is derived from information sent at an earlier time from the system controller 28 to the vehicle containing a receiver coil 90.

Similarly, in another embodiment, the method 204 may include a step of providing 229 a vehicle detection sensor 29 and the step of configuring 228a the system controller 28 may further comprise configuring the system controller 28 to detect the arrival and alignment of the vehicle containing a receiver coil 90 and activate one or more of the multiple 50 power transmitter modules 50n based on a signal received from the vehicle containing a receiver coil 90. In addition, the system controller 28 may be configured to detect the departure of the vehicle containing a receiver coil 90 and deactivate the one or more of the multiple 50 power transmitter modules 50n based on a measure of power being delivered by the one or more of the multiple 50 power transmitter modules 50n.

In embodiments, the step of electrically connecting 250 the multiple power transmitter modules 50 may further comprise providing the multiple power transmitter modules 50 embedded in a precast concrete module 48 and electrically connecting the multiple power transmitter modules 50 to each other in series.

POWER TRANSMITTER MODULES

Figure 9A:
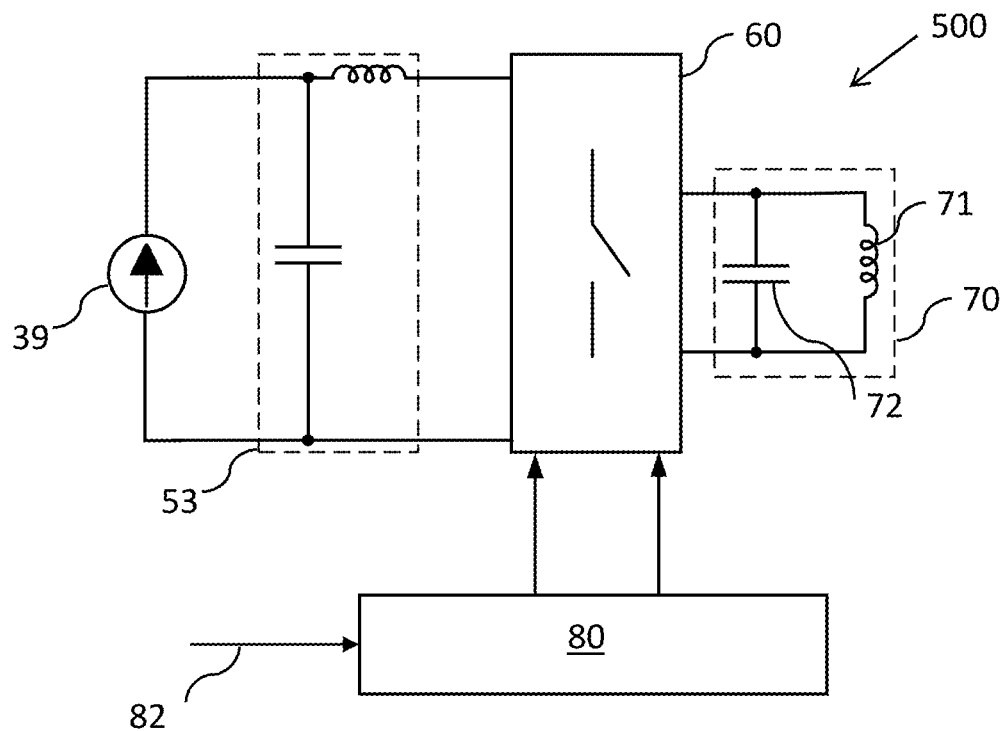
FIGS. 9A and 9B illustrate embodiments of power transmitter modules.

The present disclosure in aspects and embodiments illustrates and describes a power transmitter module, labeled in the various figures as 50n, 70, or 500. FIG. 9A illustrates a power transmitter module 500. In embodiments, a power transmitter module 500 includes a module LC input filter 53 configured to receive regulated DC output current 39 and reduce voltage ripple within the power transmitter module 500.

In embodiments, the AC/DC power converter 30 provides the regulated or constant DC current 39 to the power transmitter module 500. Regulated (or constant) DC current 39 is a constant DC current source that is constant to within +/−10% of a rated current flow, e.g., 1000 amps.

Voltage ripple within the power transmitter module 500 occurs from switching of a transistor in the module transmitter circuit 60 and changes in load flowing through the power transmitter module 500 and provided to a vehicle containing a receiver coil 90. The input inductor of LC input filter 53 is applied to maintain the regulated or constant DC current 39 into the module transmitter circuit 60.

The power transmitter module 500 further includes a module transmitter circuit 60 or H-bridge, configured to receive the regulated DC current from the module LC input filter 53 and generate a high-frequency AC current. In addition, the power transmitter module 500 has a module transmitter coil and compensation circuit 70 comprising a transmitter coil 71, and a first capacitor 72 in parallel with the transmitter coil 71. The module transmitter coil and compensation circuit 70 are configured to receive the high-frequency AC current from the module transmitter circuit 60 and generate a time-varying magnetic field (shown as the inductive wireless power 95 in FIG. 2) emitted from the transmitter coil 71.

The power transmitter module 500 also includes a module controller 80 configured to receive a power transmission input signal 82. The module controller 80 is configured to control a state of the module transmitter circuit 60 based on the power transmission input signal 82.

The state of the module transmitter circuit 60 may be closed to short circuit or bypass current flow around the module transmitter coil and compensation circuit 70. In the closed state, current will not flow through the transmitter coil 71.

A power transmission input signal 82 may originate from various sources. In embodiments, the power transmission input signal 82 originates from the system controller 28. Alternatively, the power transmission input signal 82 may originate directly from the vehicle detection circuit 29 or the vehicle communication receiver 25. The power transmission input signal 82 may indicate to the power transmitter module 500 whether an oncoming vehicle containing a receiver coil 92 should or should not receive inductive wireless power 95 from the power transmitter module 500 through the transmitter coil 71.

In another embodiment, the module controller 80 may be further configured to energize the module transmitter circuit 60 based on the power transmission input signal 82.

Figure 9B:
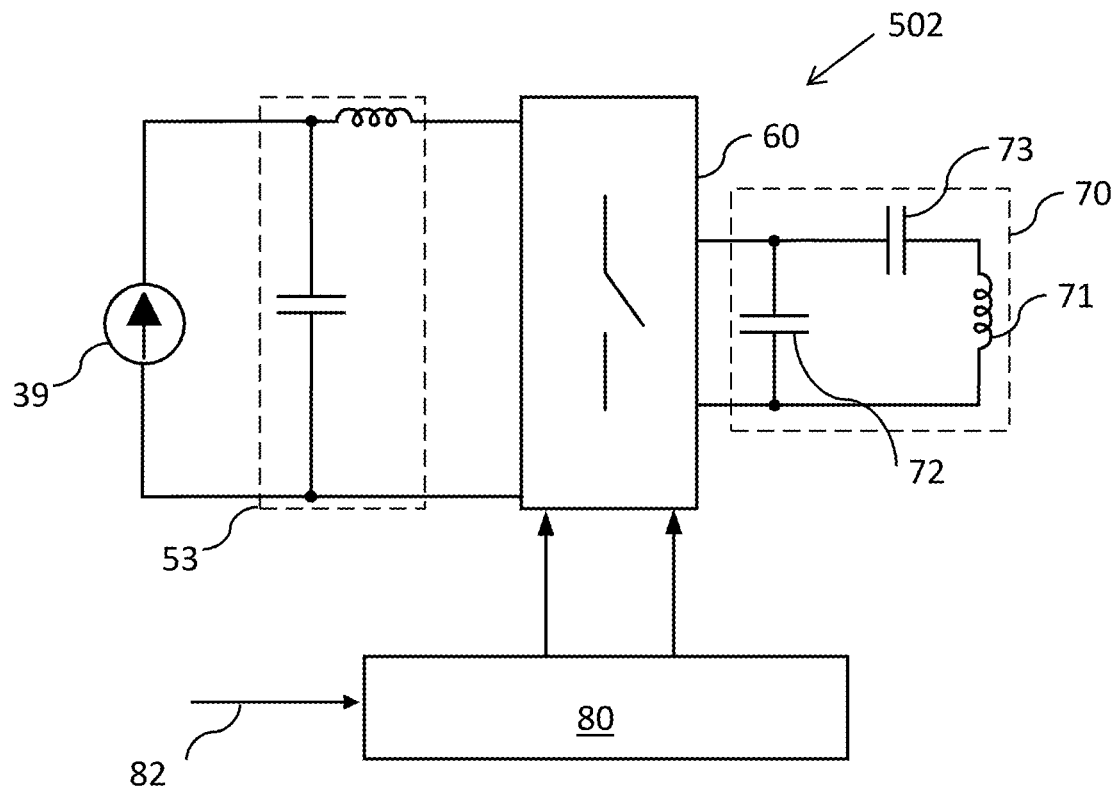

FIG. 9B illustrates another power transmitter module 502. Power transmitter module 502 further includes a second capacitor 73 as part of the module transmitter coil and compensation circuit 70. The second capacitor 73 is in series with the transmitter coil 71 and configured to compensate for a self-inductance of the transmitter coil 71.

Figure 10A:
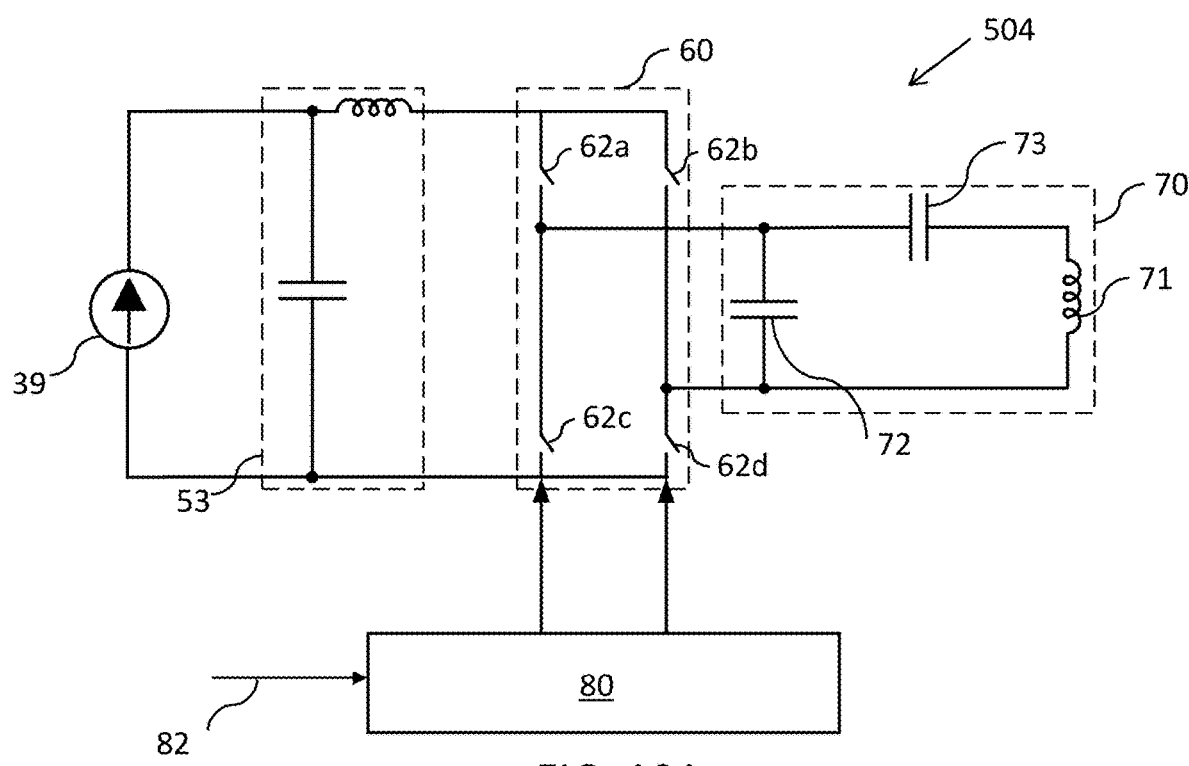
FIG. 10A illustrates another embodiment of a power transmitter module.

FIG. 10A illustrates an embodiment of another power transmitter module 504. Power transmitter module 504 includes a module transmitter circuit 60, which itself includes first 62a and second 62b current unidirectional switches arranged in parallel to each other. Module transmitter circuit 60 also includes third 62c and fourth 62d current unidirectional switches arranged in parallel to each other. The first 62a and third 62c current unidirectional switches are arranged in series to each other, and the second 62b and fourth 62d current unidirectional switches arranged in series to each other.

Figure 10B:
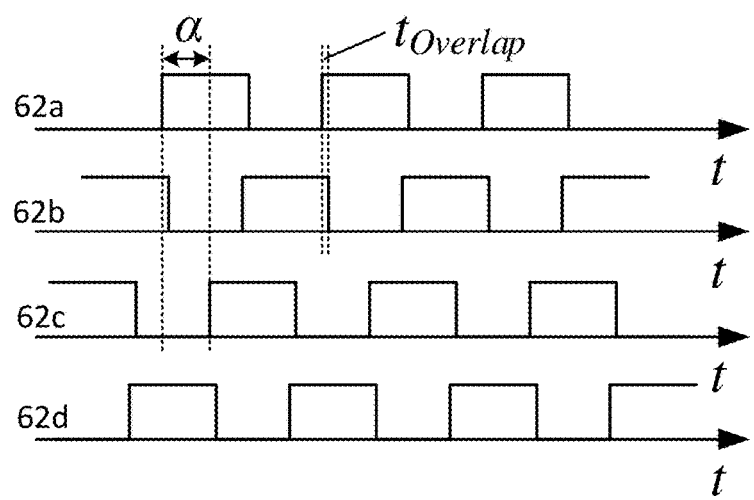
FIG. 10B illustrates an example of the state timing of the unidirectional switches in an embodiment of a power transmitter module.

When the module transmitter circuit 60 is energized, the first 62a and second 62b current unidirectional switches each operate at approximately 50% duty ratio with an overlap in their closed state and the third 62c and fourth 62d current unidirectional switches each operate at approximately 50% duty ratio with an overlap in their closed state. FIG. 10B illustrates one example of the aforementioned unidirectional switches 62a-d state timing. As shown in FIG. 10B, the rising edge of unidirectional switch 62c delays from the rising edge of unidirectional switch 62a by a time a, which in this case is 50%. Similarly, unidirectional switches 62b and 62d overlap in their closed state, also by 50%. Also, as illustrated in FIG. 10B, the closed state of unidirectional switches 62a and 62b also overlap slightly, as does the closed state of unidirectional switches 62c and 62d. As illustrated, the output of the module transmitter circuit 60 is a phase shifted rectangular current waveform. The rectangular current waveform may be used to drive the compensation network that includes a compensation capacitor and the transmitter coil self-inductance in the module transmitter coil and compensation circuit 70.

The overlapping of the closed states of unidirectional switches 62a and 62d allows the regulated DC output current 39 flow through the module transmitter coil and compensation circuit 70 in positive direction, the overlapping of the closed states of unidirectional switches 62b and 62c allows the regulated DC output current 39 flow through the module transmitter coil and compensation circuit 70 in negative direction, and the overlapping of the closed states of unidirectional switches 62a and 62c or 62b and 62d allows the regulated DC output current 39 to pass through the module transmitter circuit 60 without flowing through the module transmitter coil and compensation circuit 70.

There are multiple operational embodiments of the module transmitter circuit 60. In one operational embodiment, the switching frequency is higher than the resonant frequency such that zero current switching (ZCS) can be achieved for the unidirectional switches 62a, 62b, 62c, and 62d. In another operational embodiment, the switching frequency is lower than the resonant frequency such that the zero-voltage switching (ZVS) can be achieved for the unidirectional switches 62a, 62b, 62c, and 62d.

In another operational embodiment, if the unidirectional switches 62a, 62b, 62c, and 62d are operating at resonance, the voltage across the reflected load resistance (not illustrated) is independent from the load. Also, if the unidirectional switches 62a, 62b, 62c, and 62d are operating away from resonance, the current in the transmitter coil 71 can be independent from the load in the load range from 0 to full load. In both cases, the AC current in the transmitter coil 71 is sinusoidal, and can be controlled through phase shift between unidirectional switches 62a and 62b and unidirectional switches 62c and 62d.

Figure 11A:
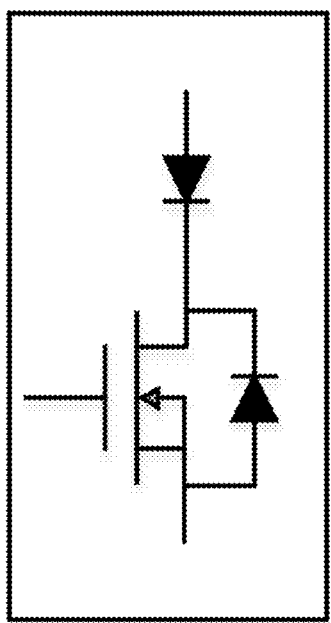
FIGS. 11A, 11B, and 11C illustrate three example topologies for unidirectional switches.
Figure 11B:
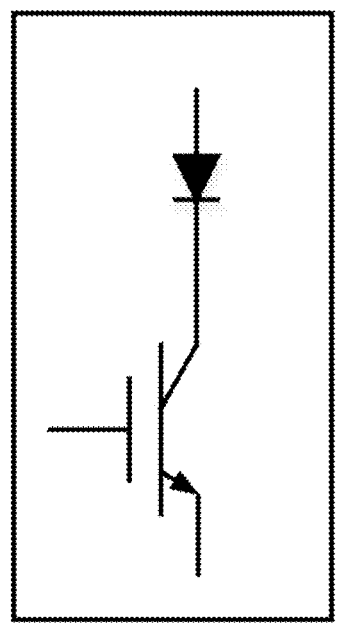
Figure 11C:
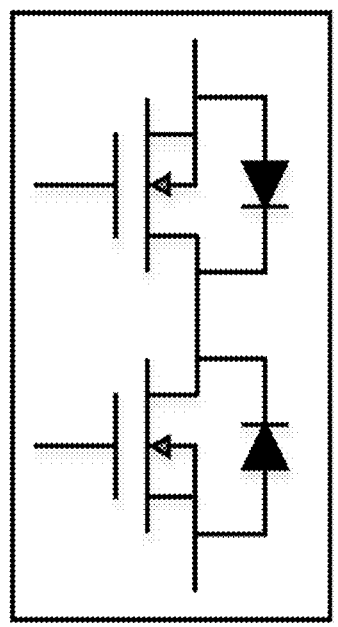

FIGS. 11A, 11B, and 11C show three example topologies for unidirectional switches 62a, 62b, 62c, and 62d. In embodiments, unidirectional switches 62a, and 62b, and unidirectional switches 62c and 62d may be arranged in the following configurations: a MOSFET in series with a diode (as shown in FIG. 11A), an IGBT in series with a diode (as shown in FIG. 11B), or two MOSFETs connected in series with opposite polarity (as shown in FIG. 11C).

In embodiments, the module transmitter circuit 60 has a switching frequency between 10 kHz and 100 MHz. Additionally, the module transmitter circuit 60 may be configured to transmit a peak power in the range from zero watts to several hundred kilowatts.

Still in other embodiments, the module controller 80 may be configured to control the module transmitter circuit 60 using phase-shift modulation, the phase-shift modulation being the time delay between the first 62a and third 62c current unidirectional switches, or the time delay between the second 62b and fourth 62d current unidirectional switches. In embodiments, the phase-shift modulation may provide the AC current at the output of the module transmitter circuit 60.

Figure 12A:
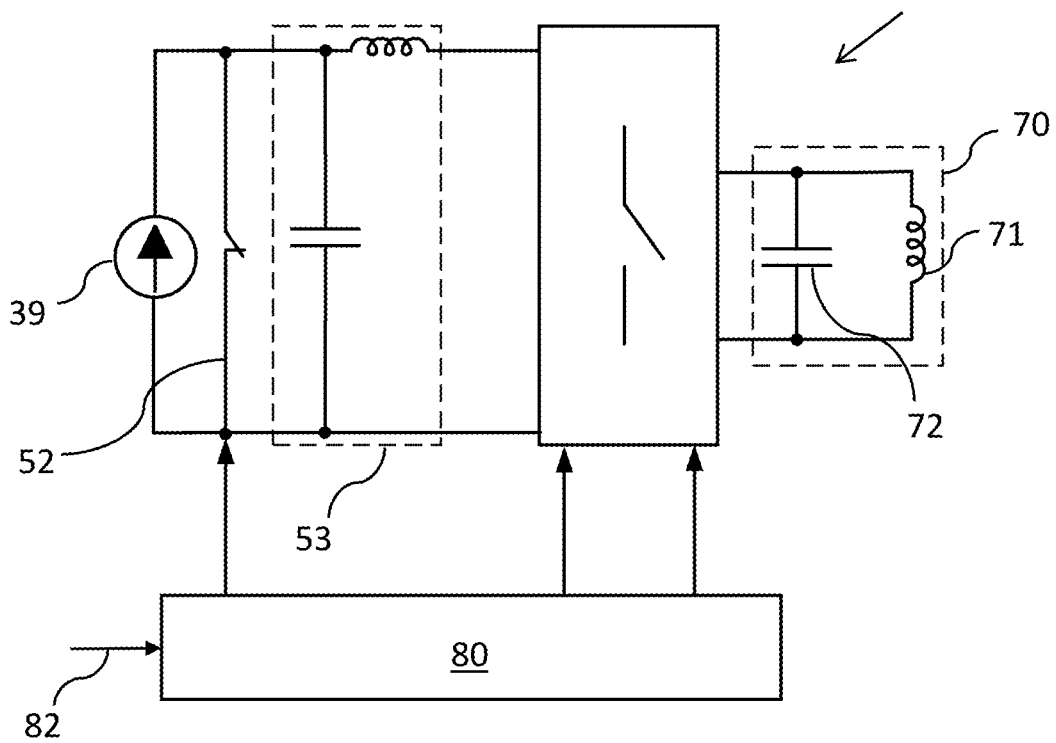
FIGS. 12A, 12B, 13A, 13B, 14A, 14B, and 14C illustrate various embodiments of power transmitter modules.

FIG. 12A illustrates another embodiment of a power transmitter module 506. Power transmitter module 506 includes a normally closed module short circuiting switch 52 that configured to bypass the regulated DC output current 39 around the module LC input filter 53. The state of the normally closed module short circuiting switch 52 may be controlled by the module controller 80 based on the power transmission input signal 82. In its normally closed state, the normally closed module short circuiting switch 52 bypasses the regulated DC output current 39 around the module LC input filter 53, the module transmitter circuit 60. In another embodiment, the module controller 80 may be configured to open the normally closed module short circuiting switch 52, when the power transmitter module 506 is activated, to flow current through the module LC input filter 53 and the module transmitter circuit 60.

Figure 12B:
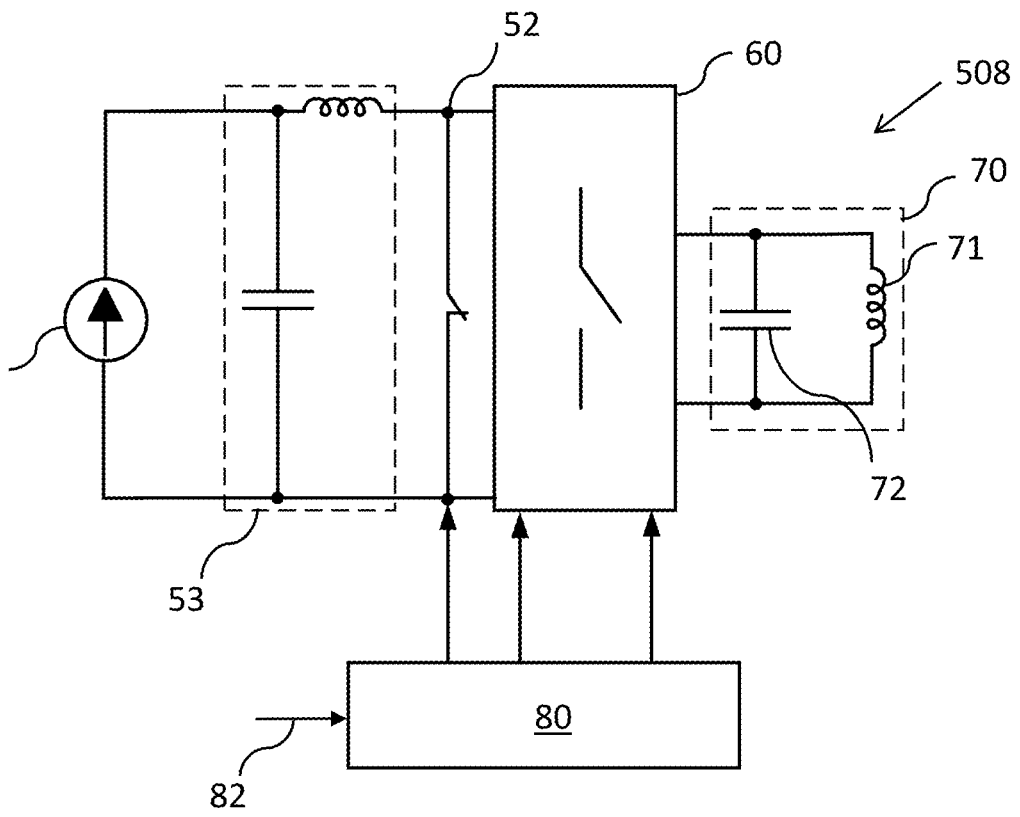

FIG. 12B illustrates another topology of a power transmitter module 508. In this embodiment, power transmitter module 508 includes a normally closed module short circuiting switch 52 that configured to bypass the regulated DC output current 39 around the module transmitter circuit 60. The state of the normally closed module short circuiting switch 52 may be controlled by the module controller 80 based on the power transmission input signal 82. In another embodiment, the module controller 80 may be configured to open the normally closed module short circuiting switch 52, when the power transmitter module 508 is activated, to flow current through the module transmitter circuit 60.

Figure 13A:
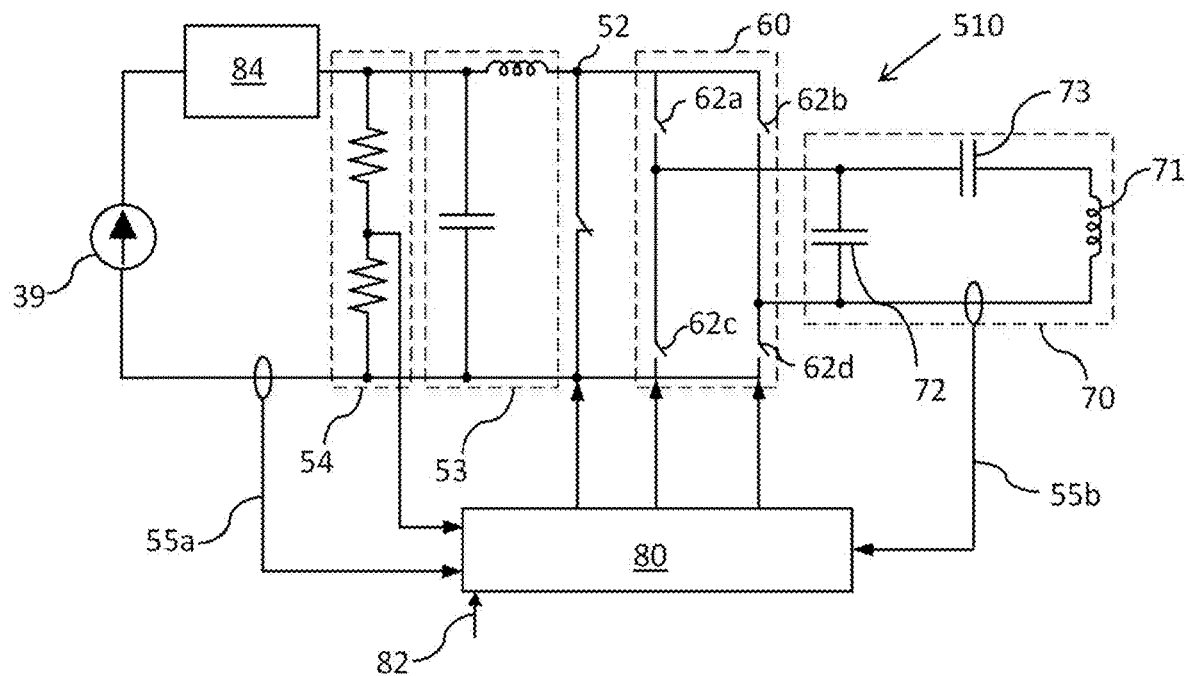

FIG. 13A illustrates another topology of a power transmitter module 510. In this embodiment, power transmitter module 510 includes a voltage sensing circuit 54. In embodiments, voltage sensing circuit 54 can measure the input voltage of the power transmitter module 510. The measured input voltage can be used to calculate the input power of the power transmitter module 510, and also may be used for protection. Power transmitter module 510 further includes a first current sensing circuit 55a configured to measure the current flow through the power transmitter module 510 and a second current sensing circuit 55b configured to measure the current flow through the module transmitter coil and compensation circuit 70.

Power transmitter module 510 also includes a module auxiliary DC power supply 84, which is configured to draw power from the regulated DC output current 39 or an outside power supply (not shown) and provide power to the other circuits and switches in the power transmitter module 510. For example, the module auxiliary DC power supply 84 may provide power to the normally closed module short circuiting switch 52, the voltage sensing circuit 54, the first or second current sensing circuits 55a or 55b, the module transmitter circuit 60 or the module controller 80.

Figure 13B:
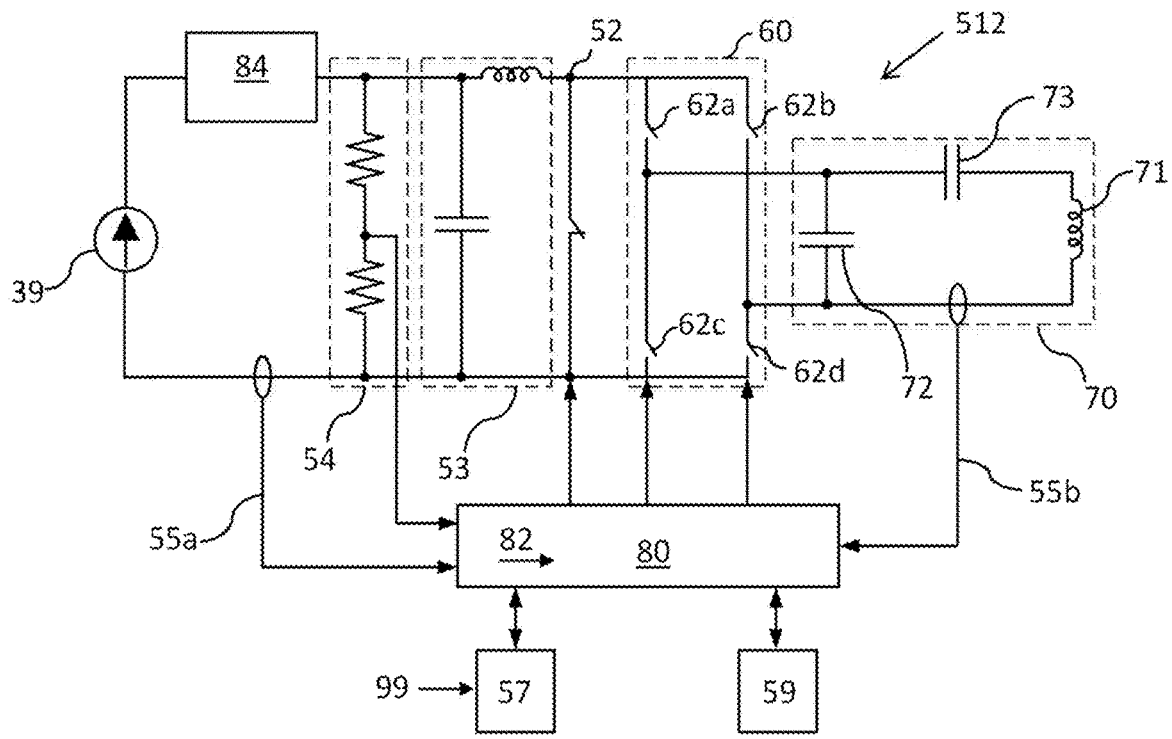

FIG. 13B illustrates another topology of a power transmitter module 512. In addition to the components shown and described with power transmitter module 510 in FIG. 13A, power transmitter module 512 in FIG. 13B further includes a module wireless communication circuit 57 and a module vehicle detection circuit 59, both configured to communicate with the module controller 80. Alternatively, the module wireless communication circuit 57 and the module vehicle detection circuit 59 may be part of the module controller 80.

All of the additional components shown with power transmitter modules 510 and 512 (shown in FIGS. 13A and 13B), as well as other power transmitter module embodiments illustrated and described throughout, may be included with any power transmitter module to enhance the features and functionality of a power transmitter module. Additionally, a power transmitter module, such as power transmitter modules 510 or 512, may be embedded in a precast concrete module 48 (shown in FIG. 4) and configured to connect in series to another power transmitter module, such as power transmitter modules 510 or 512, which may also be embedded in a precast concrete module 48.

In embodiments, the module controller 80 may be configured to detect, using the module vehicle detection circuit 59 or other means, a vehicle containing a receiver coil 90 (shown in FIG. 2) and generate the power transmission input signal 82. The power transmission input signal 82 may be generated internally (as shown in FIG. 13B) to the module controller based on input from the module vehicle detection circuit 59. Alternatively, or in addition, the module controller 80 may be configured to wirelessly communicate, using the module wireless communication circuit 57 or other means, with a vehicle containing a receiver coil 90 (shown in FIG. 2) and generate the power transmission input signal 82. The power transmission input signal 82 may be generated internally (as shown in FIG. 13B) to the module controller based on input from the module wireless communication circuit 57.

Still in other embodiments, the module controller 80 may be further configured to receive a secure code 99 from the vehicle containing a receiving coil, wherein the secure code 99 is derived from information sent at an earlier time from the module controller 80 to the vehicle containing a receiving coil. In embodiments, the module wireless communication circuit 57 may be used to communicate the secure code 99, and any other preceding communication with the vehicle containing a receiving coil.

In another embodiment, a module controller 80, such as the module controller 80 within power transmitter module 512, may be further configured to detect the arrival and alignment of the vehicle containing a receiver coil 90 (shown in FIG. 2) and activate the module transmitter circuit 60 based on a signal, e.g., signal 99, received from the vehicle containing a receiver coil 90. Alternatively, or in addition, module controller 80 may be further configured to detect the departure of the vehicle containing a receiver coil 90 (shown in FIG. 2) and deactivate the module transmitter circuit 60 based on a measure of power being delivered by the module transmitter circuit 60.

Figure 14A:
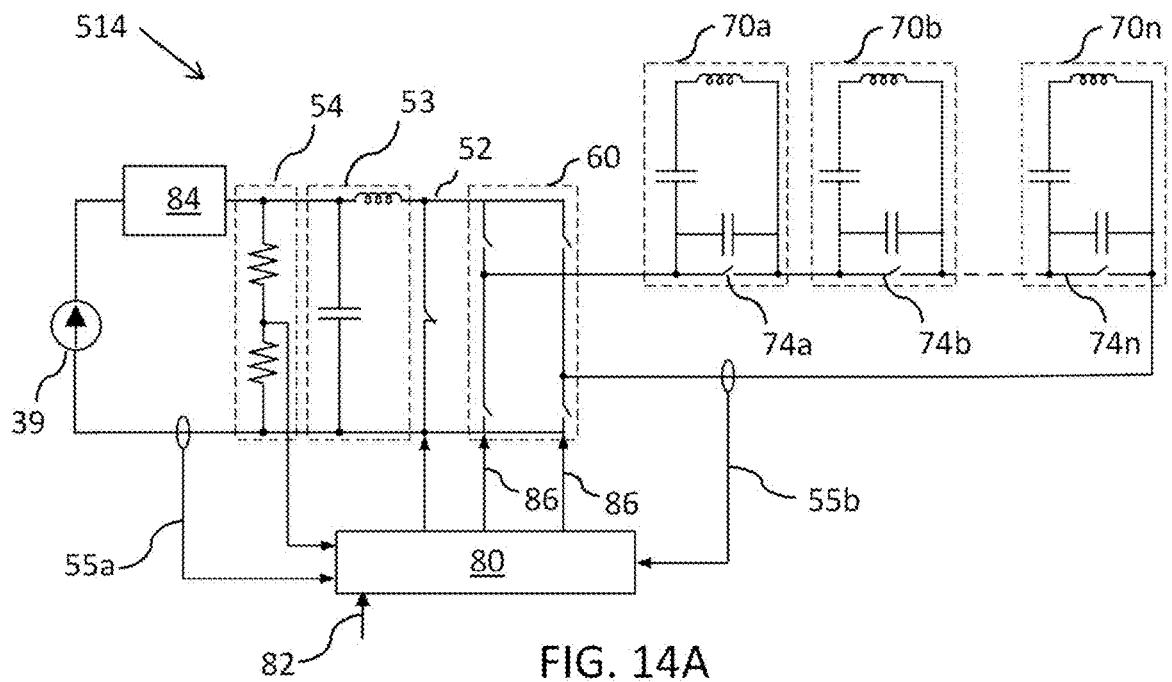

FIG. 14A illustrates another embodiment or alternate topology of a power transmitter module 514 and shows the modularity or expandability of power transmitter module embodiments illustrated and described in the present disclosure. Power transmitter module 514 includes multiple module transmitter coil and compensation circuits, in this case illustrated as 70a, 70b, and/or 70n, wired in series relative to each other. Two or more module transmitter coil and compensation circuits are possible, as represented by the 70n, where "n" indicates any integer of module transmitter coil and compensation circuits. In this embodiment, each of the multiple module transmitter coil and compensation circuits includes a normally open module transmitter coil and compensation short circuiting switch: 74a, 74b, 74n, etc. Each of the normally open module transmitter coil and compensation short circuiting switches 74a, 74b, and 74n are configured to bypass the high-frequency AC current around its respective transmitter coil and compensation circuit, in this case transmitter coil and compensation circuits 70a, 70b, and 70n. In addition, each of the multiple module transmitter coil and compensation circuits 70a, 70b, and 70n are configured to operate independently based on the power transmission input signal 82.

Power transmitter module 514 illustrates other alternative components described previously, including a module LC input filter 53, voltage sensing circuit 54, current sensing circuits 55a and 55b, module transmitter circuit 60, and module auxiliary DC power supply 84.

Figure 14B:
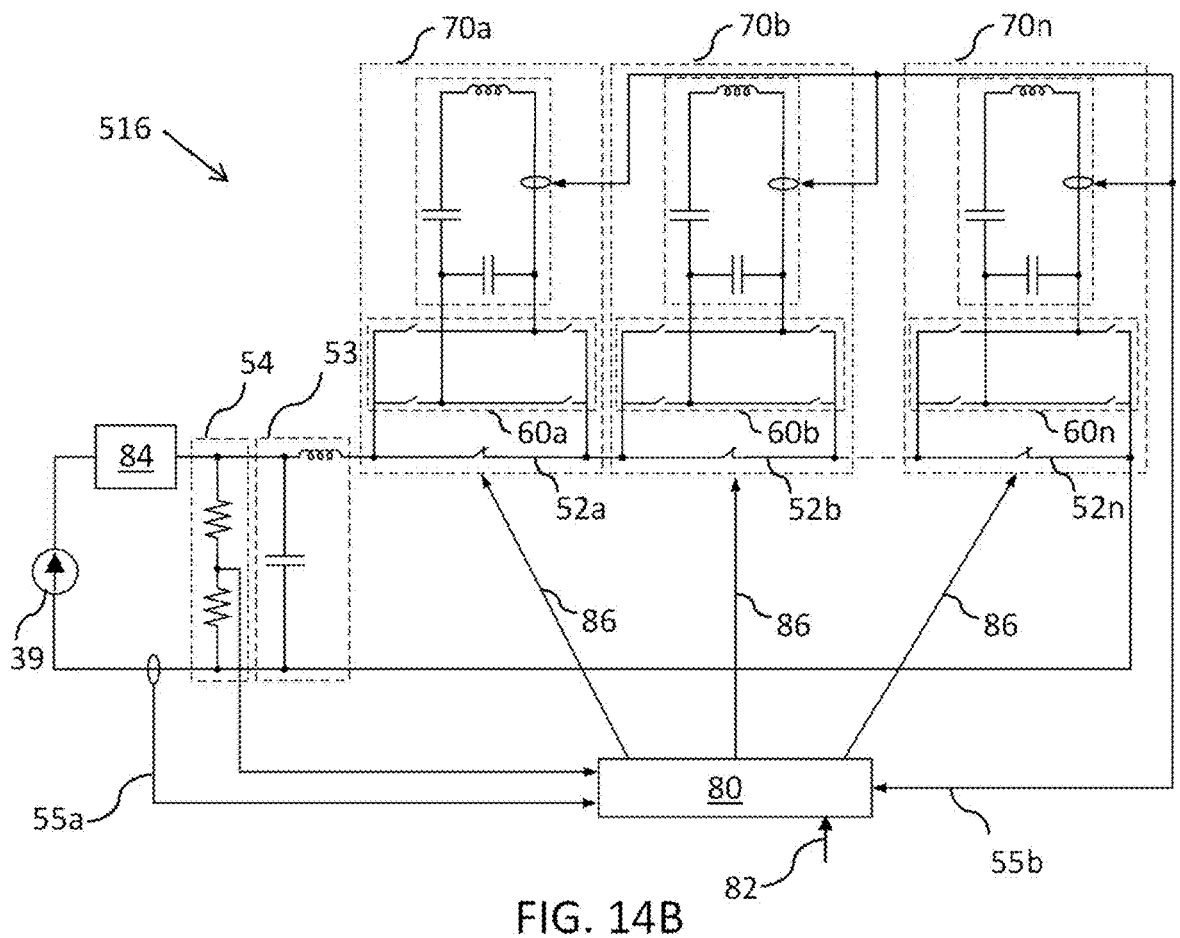

FIG. 14B illustrates another embodiment or topology of a power transmitter module 516 and shows another way a power transmitter module might be expanded. Power transmitter module 516 also includes multiple module transmitter coil and compensation circuits, illustrated as 70a, 70b, and/or 70n, wired in series relative to each other. As in power transmitter module 514, two or more module transmitter coil and compensation circuits are possible, as represented by the 70n, where "n" indicates any integer of module transmitter coil and compensation circuits.

In this embodiment, in contrast to power transmitter module 514, each of the multiple module transmitter coil and compensation circuits 70a, 70b, and/or 70n, has a corresponding normally closed module short circuiting switch: 52a, 52b, and 52n, etc. Each of the normally closed module short circuiting switches 52a, 52b, and 52n are configured to bypass the regulated DC output current 39 around the module transmitter coil and compensation circuits 70a, 70b, and 70n. In addition, each of the multiple module transmitter coil and compensation circuits 70a, 70b, and/or 70n has a corresponding module transmitter circuit 60a, 60b, and/or 60n. Each of the module transmitter circuits 60a, 60b, and/or 60n is electrically coupled to and controls the high-frequency AC current to one of the multiple module transmitter coil and compensation circuits 70a, 70b, and/or 70n. Also, each of the multiple module transmitter coil and compensation circuits 70a, 70b, and 70n are configured to operate independently based on the power transmission input signal 82.

Figure 14C:
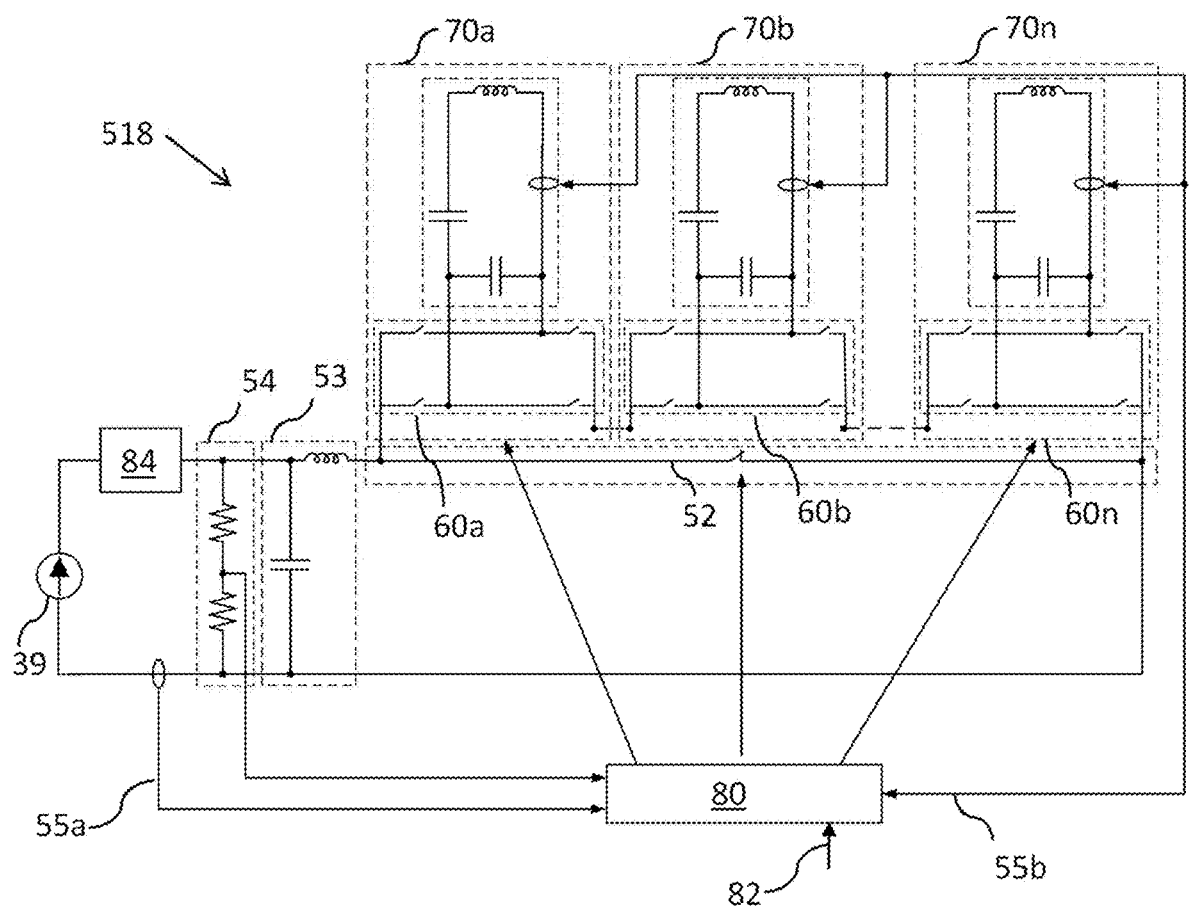

FIG. 14C illustrates another embodiment or topology of a power transmitter module 518. In this embodiment, a single modular short-circuiting switch 52 may be used to short circuit the flow of the regulated DC output current 39 through multiple module transmitting circuits 60 and multiple module transmitter coil and compensation circuits 70.

Figure 15A:
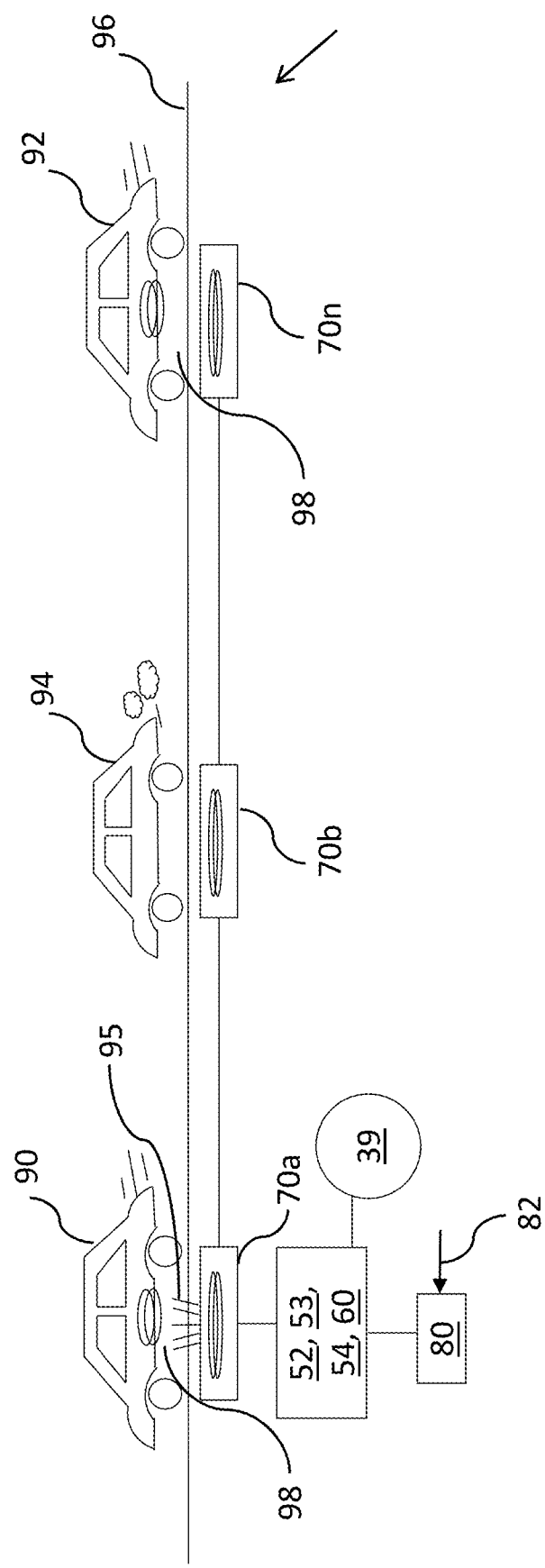
FIGS. 15A and 15B illustrate two example embodiments of the physical layout of power transmitter module embodiments.
Figure 15B:
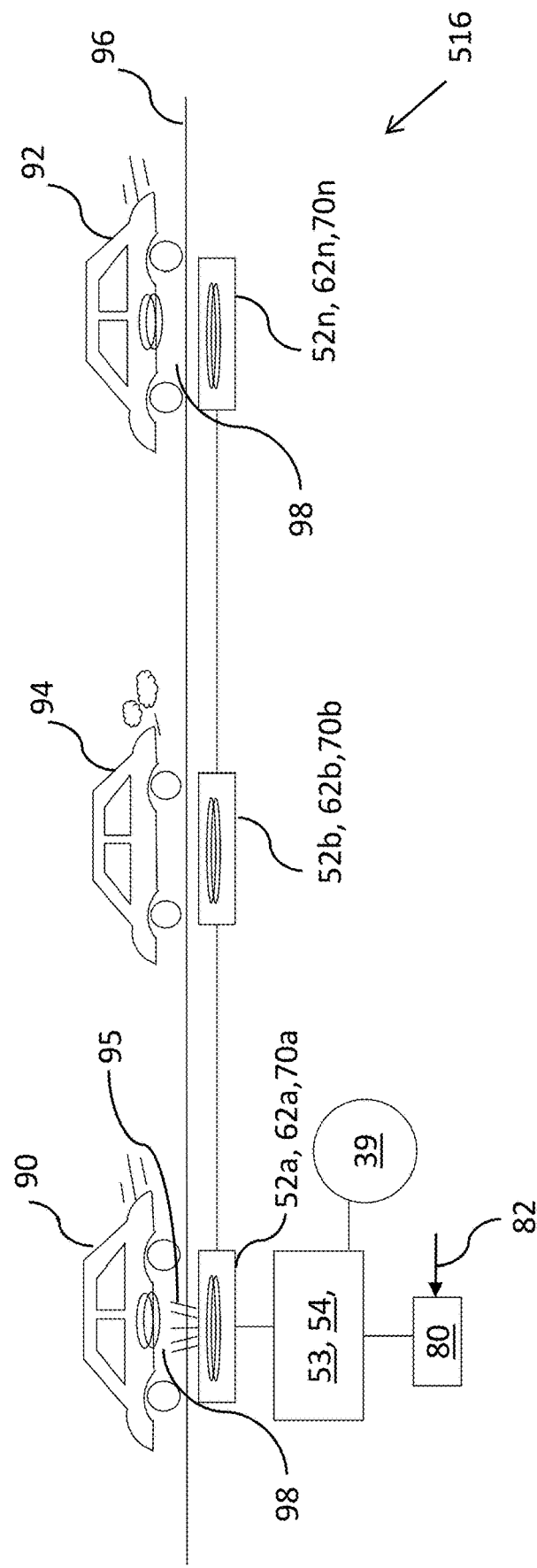

The topology of the power transmitter modules 514, 516, and 518 may be used to transfer wireless power as shown in FIGS. 15A and 15B, respectively. For example, FIGS. 15A and 15B each illustrate a vehicle containing a receiver coil 90, a vehicle without a receiver coil 94, and another vehicle with a receiver coil 92 that should not receive power from the power transmitter modules 514, 516, and 518. FIGS. 15A and 15B illustrate vehicles 90, 92, and 94 above one of the module transmitter coils and compensation circuits 70a, 70b, and 70n, each capable of transmitting inductive wireless power 95 over an air gap 98. In the FIGS. 15A and 15B illustrations, and in embodiments, the vehicle containing a receiver coil 90 is in a position to receive the inductive wireless power 95 from the power transmitter modules 514, 516, or 518 because it is over and aligned with one of the module transmitter coils and compensation circuits 70a.

In FIGS. 15A and 15B, the other vehicle with a receiver coil 92 that should not receive power from the power transmitter modules 514, 516, or 518 is also illustrated as being over and aligned with one of the module transmitter coils and compensation circuits 70n, but it is not receiving inductive wireless power 95 from the power transmitter modules 514 or 516. The other vehicle with a receiver coil 92 that should not receive power (and is not receiving power) from the power transmitter modules 514, 516, or 518 may not be receiving power for multiple reasons. For example, the vehicle 92 may not subscribe to receive power from the utility providing power to the power transmitter modules 514, 516, or 518. Alternatively, the vehicle 92 may not need to receive power at the time it is over and aligned with one of the module transmitter coils and compensation circuits 70n because its batteries, or other energy storage means, may be nearly full or otherwise incapable of receiving additional power at that time.

In both embodiments of power transmitter modules 514, 516, or 518, as illustrated in FIGS. 14A, 14B, 14C, 15A, and 15B, each of the multiple module transmitter coil and compensation circuits 70a, 70b, and 70n are configured to operate independently based on the power transmission input signal 82. As in other embodiments, the power transmission input signal 82 may come externally from the module controller 80 or may be generated internally within the module controller 80 based on logic or signals received from other components, for example, voltage sensing circuit 54, current sensing circuits 55a and 55b or other circuits not shown (system wireless communication 26, vehicle detection circuit 29, or others). This allows the power transmitter modules 514, 516, or 518 to transfer inductive wireless power 95 on a car-by-car basis depending on which cars should receive inductive wireless power 95 and which should not.

As illustrated in FIGS. 14A, 14B, and 14C, in embodiments, synchronization signals 86 are distributed to the module transmitter circuit 60, or the unidirectional switches 62a, 62b, 6c, and 62d, such that synchronized magnetic fields are created along the road 96 along the electrified roadway.

Still in other embodiments, the module transmitter coil and compensation circuits 70, 70a, 70b, or 70n in power transmitter modules 500-518 may be configured to transfer inductive wireless power 95 to a vehicle containing a receiver coil 90 travelling with a speed in the range from zero miles-per-hour to full highway speed.

Figure 16:
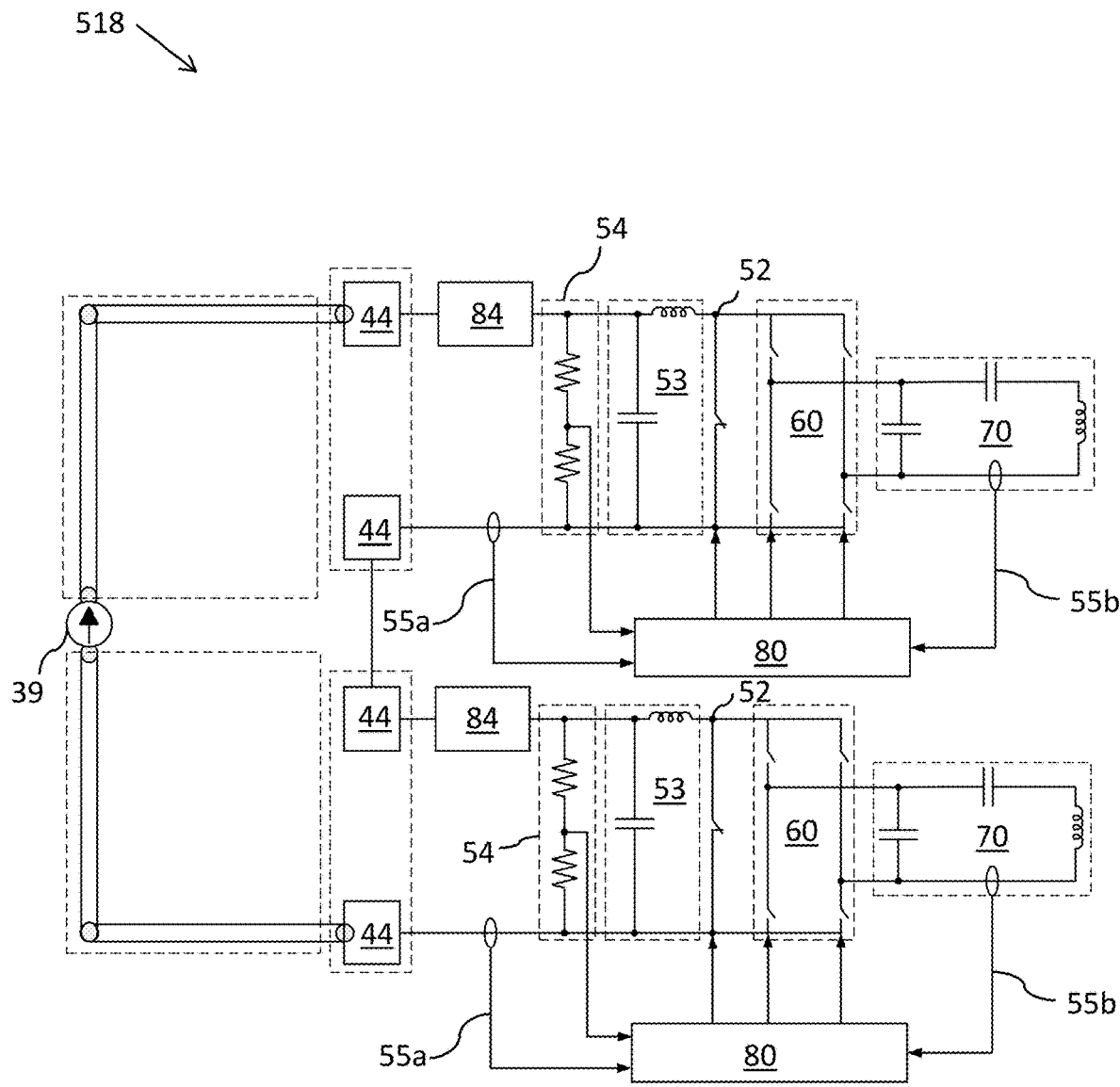
FIG. 16 illustrates the topology of an embodiment of two power transmitter modules connected in series.

FIG. 16 illustrates another embodiment of two power transmitter modules 518 connected in series. In this embodiment, each power transmitter module includes a module LC input filter 53, a module transmitter circuit 60, and module transmitter coil and compensation circuit 70. Other potential components of the power transmitter module 518 are also illustrated.

METHODS FOR PROVIDING INDUCTIVE WIRELESS POWER TRANSFER THROUGH A POWER TRANSMITTER MODULE

Figure 17:
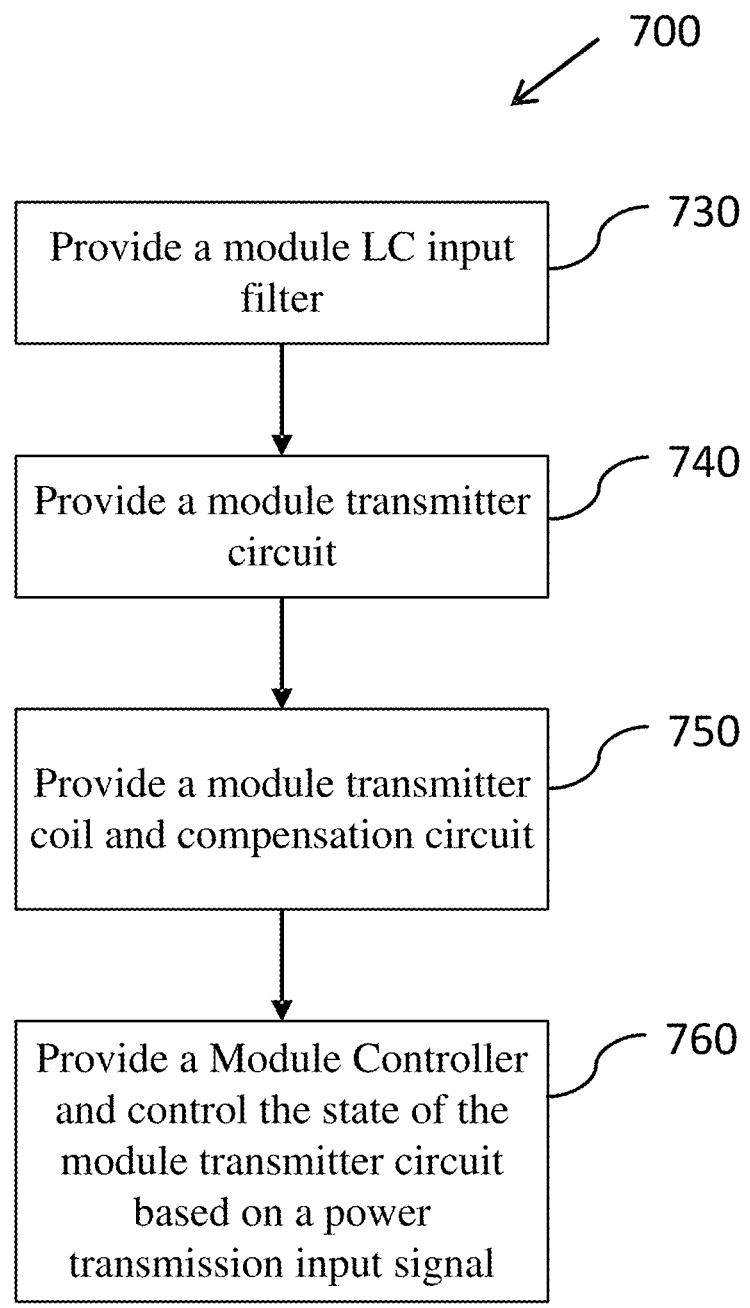
FIG. 17 illustrates a method for providing inductive wireless power transfer through one or more power transmitter modules.

The present disclosure describes methods for providing inductive wireless power transfer through one or more power transmitter modules. FIG. 17 illustrates a method 200 for providing DIPT. In embodiments, the method 700 includes providing 730 a module LC input filter configured to receive regulated DC current and reduce voltage ripple within the roadway integrated transmitter module. The method 700 further includes providing 740 a module transmitter circuit configured to receive the regulated DC current from the module LC input filter and generate a high-frequency AC current. Additionally, the method 700 includes providing 750 a module transmitter coil and compensation circuit comprising a transmitter coil, and a first capacitor in parallel with the transmitter coil, the module transmitter coil and compensation circuit configured to receive the high-frequency AC current from the module transmitter circuit and generate a time-varying magnetic field from the transmitter coil. Finally, method 700 includes providing 760 a module controller configured to receive a power transmission input signal, the module controller configured to control a state of the module transmitter circuit based on the power transmission input signal.

In another embodiment, the step of providing a module transmitter coil and compensation circuit further comprises providing a second capacitor in series with the transmitter coil. In this step, the second capacitor is configured to compensate a self-inductance of the transmitter coil.

Alternatively, or in addition, the step of providing the module transmitter circuit further comprises providing within the module transmitter circuit: first and second current unidirectional switches arranged in parallel to each other; third and fourth current unidirectional switches arranged in parallel to each other, the first and third current unidirectional switches arranged in series to each other, and the second and fourth current unidirectional switches arranged in series to each other. In this embodiment, when the module transmitter circuit is energized, the first and second current unidirectional switches each operate at approximately 50% duty ratio with an overlap in their closed state and the third and fourth current unidirectional switches each operate at approximately 50% duty ratio with an overlap in their closed state.

In another embodiment, the step of providing the first, second, third, and fourth unidirectional switches comprises providing the first, second, third, and fourth unidirectional switches in a configuration selected from the group consisting of: a MOSFET in series with a diode; an IGBT in series with a diode; or two MOSFETs connected in series with opposite polarity.

In another embodiment, the step of providing the module controller includes configuring the module controller to energize the module transmitter circuit based on the power transmission input signal. Similarly, in another embodiment, the method 700 might further include providing a normally closed module short circuiting switch configured to bypass the regulated DC current around the module LC input filter.

Method 700 may further include configuring the module controller to open the normally closed module short circuiting switch when the power transmitter module is activated. Additionally, method 700 may further include providing a normally closed module short circuiting switch configured to bypass the regulated DC current around the module transmitter circuit.

In another embodiment, method 700 may further include: providing a voltage sensing circuit; providing a first current sensing circuit configured to measure the current flow through the power transmitter module; providing a second current sensing circuit configured to measure the current flow through the transmitter coil; and providing an auxiliary DC power supply configured to draw power from the regulated DC current or an outside power supply. The auxiliary DC power supply may provide power to: the normally closed module short circuiting switch; the voltage sensing circuit; the first current sensing circuit; the second current sensing circuit; the module transmitter circuit; or the module controller.

In another embodiment, method 700 may further include configuring the module transmitter circuit to have a switching frequency between 10 kHz to one MHz and to transmit a peak power in the range from zero watts to several hundred kilowatts. In addition, method 700 In another embodiment, method 700 may further include configuring the module transmitter coil and compensation circuit to transfer inductive wireless power to an oncoming vehicle containing a receiver coil travelling with a speed in the range from 0 miles-per-hour to full highway speed.

In another embodiment, method 700 may further include configuring the module transmitter controller to control the module transmitter circuit using phase-shift modulation, the phase-shift modulation being the time delay between the first and third current unidirectional switches, or the time delay between the second and fourth current unidirectional switches.

In another embodiment, method 700 may further include configuring the module controller to detect a vehicle containing a receiving coil and generate the power transmission input signal.

In another embodiment, method 700 may further include configuring the module controller to wirelessly communicate with a vehicle containing a receiving coil and generate the power transmission input signal. In addition, method 700 may also include configuring the module controller to receive a secure code from the vehicle containing a receiving coil. In this embodiment, the secure code is derived from information sent at an earlier time from the module controller to the vehicle containing a receiving coil. Still in addition, method 700 may further include configuring the module controller to detect the arrival and alignment of the vehicle containing a receiving coil and activate the module transmitter circuit based on a signal received from the vehicle containing a receiving coil as well as detect the departure of the vehicle containing a receiving coil and deactivate the module transmitter circuit based on a measure of power being delivered by the module transmitter circuit.

In another embodiment, method 700 may further include providing the power transmitter module embedded in a precast concrete module and configuring the power transmitter module to connect in series to another power transmitter module.

Still in another embodiment, method 700 may include providing the module transmitter coil and compensation circuit that has multiple module transmitter coil and compensation circuits, wherein each of the multiple module transmitter coil and compensation circuits further comprises a normally open module transmitter coil and compensation short circuiting switch configured to bypass the high-frequency AC current around its respective transmitter coil and compensation circuit. In addition, each of the multiple module transmitter coil and compensation circuits are configured to operate independently based on the power transmission input signal.

Still in another embodiment, method 700 may include providing the module transmitter circuit with multiple module transmitter circuits; providing the module transmitter coil and compensation circuit with multiple module transmitter coil and compensation circuits. In this embodiment, each of the multiple module transmitter circuits is electrically coupled to and controls the high-frequency AC current to one of the multiple module transmitter coil and compensation circuits and each of the multiple module transmitter circuits are configured to operate independently based on the power transmission input signal.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made, and are also intended to be encompassed by the following claims.

What is claimed is:

1. A method for dynamic inductive wireless power transmission (DIPT), comprising:
    providing an AC-to-DC (AC/DC) power converter configured to receive three-phase power and provide regulated DC output current, wherein output of the AC-to-DC power converter is regulated DC output current;
    electrically connecting a trunk cable to an output of the AC/DC power converter and to multiple power transmitter modules, the trunk cable connecting inputs of the multiple power transmitter modules in series, the multiple power transmitter modules configured to transmit inductive wireless power over an air gap, the trunk cable electrically receives regulated DC current from the AC-to-DC converter, the multiple power transmitter modules each comprising an inverter and transmitter coil and configured to receive the regulated DC current from the trunk cable, to generate a high-frequency AC current and to input the high-frequency AC current to the transmitter coil which is configured to transmit inductive wireless power over an air gap;
    providing a system controller configured to detect a vehicle containing a receiver coil and confirm if the vehicle containing the receiver coil should receive the inductive wireless power from the multiple power transmitter modules; and
    configuring the system controller to communicate with the AC/DC power converter to maintain the regulated DC output current at a constant value and to transmit the inductive wireless power to the vehicle containing the receiver coil through the multiple power transmitter modules when the vehicle containing the receiver coil should receive the inductive wireless power from the multiple power transmitter modules.

2. The method of claim 1, wherein the three-phase power received by the AC/DC power converter is received from one of an alternating current (AC) utility source a battery bank, a capacitor bank, a photovoltaic solar array, and/or a wind turbine.

3. The method of claim 1, wherein configuring the system controller further comprises configuring the system controller to:
    wirelessly communicate with the vehicle containing the receiving coil and use the communication to determine whether the vehicle containing the receiver coil should receive the inductive wireless power; and
    activate one or more of the multiple power transmitter modules such that at least one power transmitter module of the multiple power transmitter modules transfers the inductive wireless power to the vehicle containing the receiving coil.

4. The method of claim 3, further comprising configuring the system controller to wirelessly communicate a secure code with the vehicle containing the receiving coil, wherein the secure code is derived from information sent at an earlier time from the system controller to the vehicle containing the receiving coil.

5. The method of claim 3, further comprising configuring the system controller to:
  detect arrival and alignment of the vehicle containing the receiving coil and activate one or more of the multiple power transmitter modules based on a signal received from the vehicle containing the receiving coil, and
  detect departure of the vehicle containing the receiving coil and deactivate the one or more of the multiple power transmitter modules transmitting inductive wireless power based on a measure of power being delivered by the one or more of the multiple power transmitter modules.

6. The method of claim 1, further comprising providing one or more of the multiple power transmitter modules embedded in a precast concrete module and electrically connecting the multiple power transmitter modules to each other in series.

7. The method of claim 1, further comprising providing at least one of the multiple power transmitter modules and a portion of the trunk cable embedded in a precast concrete module and electrically connecting in series the at least one of the multiple power transmitter modules to another one of the multiple power transmitter modules embedded in a precast concrete module.

8. The method of claim 7, further comprising providing one or more vehicle detection sensors embedded in the precast concrete module and configuring the one or more vehicle detection sensors to detect vehicle speed and/or position of the vehicle containing the receiver coil.

9. The method of claim 1, further comprising:
  providing the multiple power transmitter modules embedded in one or more precast concrete modules, wherein one or more of the multiple power transmitter modules are embedded in each precast concrete module and a portion of trunk cable extends to two trunk cable connections of the precast concrete module, wherein when two or more of the multiple power transmitter modules are embedded in a precast concrete module, a portion of the trunk cable connects inputs of the power transmitter modules in the precast concrete module;
  connecting the trunk cable from an output current connection of the AC/DC power converter to a trunk cable connection of a first precast concrete module of the one or more precast concrete modules;
  connecting, when the one or more precast concrete modules comprise two or more precast concrete modules, trunk cable between trunk cable connections of each of the two or more precast modules; and
  connecting the trunk cable between a last precast concrete module of the one or more precast concrete modules and a return connection of the AC/DC power converter, wherein only a current path from the output of the AC/DC power converter is connected and transmitted through the one or more precast concrete modules and a return path from the last precast concrete module to the return connection is routed outside of the precast concrete modules.

10. The method of claim 1, wherein the AC/DC power converter is a first AC/DC power converter and further comprising providing a second AC/DC power converter configured to receive three-phase power and provide regulated DC output current, wherein a first portion of the multiple power transmitter modules are connected with inputs connected in series and to a connection to the first AC/DC power converter providing the regulated DC output current in a first trunk cable loop and a second portion of the multiple power transmitter modules are connected with inputs connected in series and to a connection to the second AC/DC power converter providing the regulated DC output current in a second trunk cable loop, and wherein the system controller communicates with the first and the second AC/DC power converters to maintain regulated DC output current to both AC/DC power converters, and wherein providing the second AC/DC power converter increases power delivery capability.

11. The method of claim 1, further comprising providing a vehicle position detection circuit configured to indicate when the vehicle containing the receiver coil is arriving and aligned with a transmitter coil in a power transmitter module of the multiple power transmitter modules.

12. The method of claim 1, further comprising providing a vehicle communication receiver configured to indicate when the vehicle containing the receiver coil is arriving and aligned with a transmitter coil in a power transmitter module of the multiple power transmitter modules.

13. The method of claim 1, further comprising configuring the trunk cable to receive an additional AC/DC power converter and increase power capability of a DIPT system.

14. The method of claim 1, further comprising physically locating multiple of the multiple power transmitter modules next to each other in a roadway and configuring the multiple power transmitter modules to activate simultaneously and deliver the inductive wireless power simultaneously to multiple vehicles containing a receiver coil.

15. The method of claim 1, further comprising physically locating multiple of the multiple power transmitter modules next to each other in a roadway and configuring the multiple power transmitter modules to activate simultaneously and deliver the inductive wireless power simultaneously to multiple receiving coils on a vehicle.

16. The method of claim 1, wherein configuring the system controller further comprises configuring the system controller to:
  perform functions selected from the group consisting of:
    catalog the vehicle containing the receiver coil;
    determine a status of the vehicle containing the receiver coil;
    record a time of passage of the vehicle containing the receiver coil; and
    measure an amount of wireless power transferred to the vehicle containing the receiver coil.

17. The method of claim 1, wherein configuring the system controller further comprises configuring the system controller to communicate with the vehicle containing the receiver coil and assess an amount of inductive wireless power the vehicle containing the receiver coil is receiving from a DIPT system.

* * * * *